(12) United States Patent
Bennett et al.

(10) Patent No.: US 12,539,783 B2
(45) Date of Patent: Feb. 3, 2026

(54) ELECTRIC VEHICLE CHARGING MANAGEMENT WITH CHARGING SCHEDULING VIA VEHICLE RANKING

(71) Applicant: Rivian IP Holdings, LLC, Plymouth, MI (US)

(72) Inventors: Tyler Jennings Bennett, Long Beach, CA (US); Ben Villagra, Palo Alto, CA (US); Chakri Allamsetty, San Jose, CA (US); Preetinder Singh Dhaliwal, Dublin, CA (US); Nilesh Darade, Milpitas, CA (US); Tyler Erikson, Torrance, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 656 days.

(21) Appl. No.: 18/051,587

(22) Filed: Nov. 1, 2022

(65) Prior Publication Data

US 2024/0140253 A1    May 2, 2024

(51) Int. Cl.
| | |
|---|---|
| *B60L 53/68* | (2019.01) |
| *B60L 53/62* | (2019.01) |
| *B60L 53/63* | (2019.01) |
| *B60L 53/67* | (2019.01) |
| *G06Q 10/0631* | (2023.01) |
| *G06Q 50/06* | (2024.01) |

(52) U.S. Cl.
CPC ............... *B60L 53/68* (2019.02); *B60L 53/62* (2019.02); *B60L 53/63* (2019.02); *B60L 53/67* (2019.02); *G06Q 10/06315* (2013.01); *G06Q 50/06* (2013.01)

(58) Field of Classification Search
CPC .......... B60L 53/68; B60L 53/62; B60L 53/63; B60L 53/67; B60L 53/00; B60L 53/65; B60L 53/66; G06Q 10/06315; G06Q 50/06

See application file for complete search history.

(56) References Cited

U.S. PATENT DOCUMENTS

| | | | |
|---|---|---|---|
| 2019/0375308 A1* | 12/2019 | Vaughan | B60L 53/63 |
| 2021/0347267 A1 | 11/2021 | Erikson et al. | |
| 2021/0347279 A1 | 11/2021 | Erikson et al. | |
| 2021/0350298 A1 | 11/2021 | Erikson et al. | |
| 2022/0097540 A1* | 3/2022 | Atluri | H02J 7/0048 |
| 2023/0158910 A1* | 5/2023 | Mandel-Senft | B60W 60/001 701/26 |
| 2023/0246471 A1* | 8/2023 | Salter | B60L 53/67 320/109 |
| 2024/0042888 A1* | 2/2024 | Goswami | H02J 7/0048 |

* cited by examiner

*Primary Examiner* — David V Henze-Gongola
(74) *Attorney, Agent, or Firm* — Foley & Lardner LLP

(57) ABSTRACT

A system including one or more processors is provided. The one or more processors can determine, responsive to an arrival of an electric vehicle at a dispenser of a plurality of dispensers coupled with a power module of a power cabinet, a status of each of the plurality of dispensers. The one or more processors can generate a schedule to control the plurality of dispensers based at least in part on the status of each of the plurality of dispensers. The one or more processors can provide the schedule to the power cabinet to cause the power cabinet to control the power module to deliver power to one of the plurality of dispensers in accordance with the schedule.

16 Claims, 7 Drawing Sheets

ELECTRIC VEHICLE CHARGING MANAGEMENT WITH CHARGING SCHEDULING VIA VEHICLE RANKING

INTRODUCTION

A vehicle, such as an electric vehicle, can be powered by batteries. The batteries can be charged by dispensers.

SUMMARY

This disclosure is generally directed to a solution for controlling dispensers coupled with a power cabinet in a chain configuration (e.g., a daisy chain configuration). One or more chains of dispensers can be connected to a power cabinet at an electric vehicle charging site. Each chain can be configured such that one (e.g., only one) dispenser in the chain charges a vehicle at a time. The chain configuration can reduce the amount of equipment that is used to charge a fleet of vehicles as compared to systems that attempt to charge each vehicle of the fleet in parallel.

A computer operating in a cloud environment can generate and provision a schedule controlling which dispensers of the chain charge electric vehicles over time. To do so, a computer operating in the cloud can communicate across a network with the dispensers or the power cabinet to identify the vehicles connected to the dispensers and data about the vehicles. Based on the data about the vehicles, the computer can generate a schedule identifying an order or time periods for charging the vehicles connected to the dispensers. The computer can generate the schedule to ensure vehicles of a fleet of vehicles are sufficiently charged to reach destinations identified on a dispatch schedule for the fleet. The computer can transmit the schedule to the power cabinet. A controller coupled to or operating within the power cabinet can receive the schedule and control the dispensers according to the schedule to charge individual vehicles connected to the dispensers of the chain of dispensers. Thus, a chain configuration of dispensers can be controlled by a computer across a network according to data the computer receives regarding the vehicles connected to the chain.

At least one aspect is directed to a system. The system can include one or more processors. The one or more processors can be coupled with memory to determine, responsive to an arrival of an electric vehicle at a dispenser of a plurality of dispensers coupled with a power module of a power cabinet, a status of each of the plurality of dispensers. The one or more processors can be coupled with memory to generate a schedule to control the plurality of dispensers based at least in part on the status of each of the plurality of dispensers. The one or more processors can be coupled with memory to provide the schedule to the power cabinet to cause the power cabinet to control the power module to deliver power to one of the plurality of dispensers in accordance with the schedule.

At least one aspect is directed to a method. The method can include determining, by one or more processors coupled with memory and responsive to an arrival of an electric vehicle at a dispenser of a plurality of dispensers coupled with a power module of a power cabinet, a status of each of the plurality of dispensers. The can include generating, by the one or more processors, a schedule to control the plurality of dispensers based at least in part on the status of each of the plurality of dispensers. The method can include providing, by the one or more processors, the schedule to the power cabinet to cause the power module to deliver power to one of the plurality of dispensers in accordance with the schedule.

At least one aspect is directed to a power cabinet. The power cabinet can include one or more processors. The one or more processors can be coupled with memory to transmit, to a computer over a network, an indication of an arrival of an electric vehicle at a dispenser of a plurality of dispensers coupled with a power module of the power cabinet. The one or more processors can be coupled with memory to receive, from the computer, a schedule to control the plurality of dispensers generated based on a status of each of the plurality of dispensers. The one or more processors can be coupled with memory to control the power module to deliver power to one of the plurality of dispensers in accordance with the schedule.

At least one aspect is directed to a system. The system can include one or more processors. The one or more processors can be coupled with memory to identify, responsive to an arrival of an electric vehicle at a dispenser of a plurality of dispensers coupled with a power module of a power cabinet, a plurality of electric vehicles connected to a subset of a plurality of dispensers. The one or more processors can be coupled with memory to determine an order of a queue in which to charge the plurality of electric vehicles based on data for each the plurality of electric vehicles. The one or more processors can be coupled with memory to provide a schedule containing the order of the queue to the power cabinet to cause the power cabinet to control the plurality of dispensers in accordance with the order of the queue.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
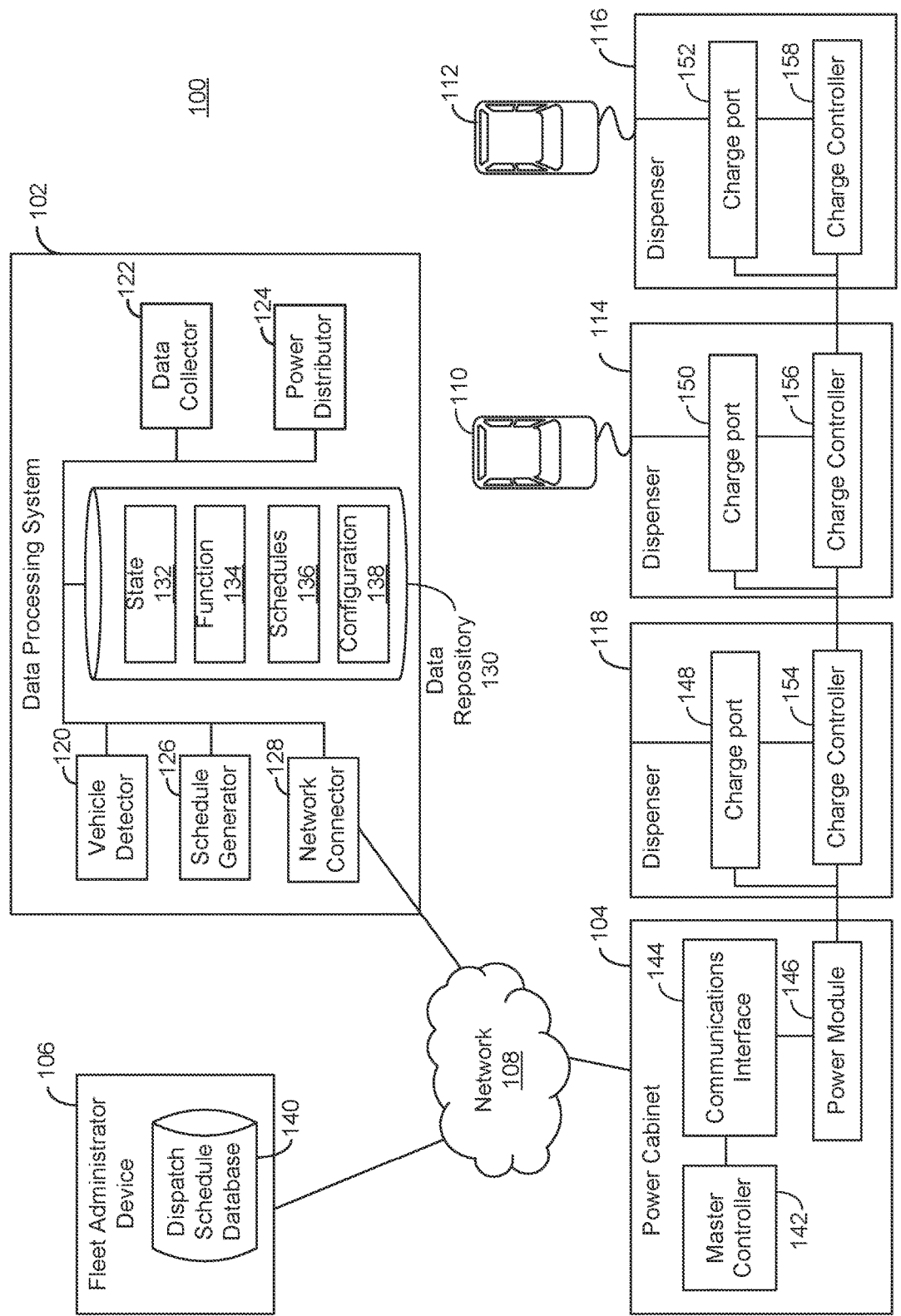
FIG. 1 depicts a system to manage daisy chain charging in a cloud-based environment, in accordance with present implementations.

Following below are more detailed descriptions of various concepts related to, and implementations of, methods, apparatuses, and systems of electric vehicle charging management. The various concepts introduced above and discussed in greater detail below may be implemented in any of numerous ways.

This disclosure is generally directed to systems and methods to control electricity dispensers coupled with a power cabinet in a chain configuration. One or more chains of electricity dispensers can be connected to a power cabinet or each other at an electric vehicle charging site. Each chain can be configured such that only one dispenser in the chain charges a vehicle at a time. The chain can be configured in this manner by hardware (e.g., a switching mechanism across the dispensers of the chain that causes only one dispenser to be able to dispense energy at a time) or software (e.g., control signals that a controller within the power cabinet transmits to the dispensers to cause one dispenser to dispense energy at a time). The chain configuration can significantly reduce the amount of equipment that is needed to charge a fleet of vehicles as compared to systems that attempt to charge each vehicle of the fleet in parallel. This technology can reduce the amount of main power supply used to charge vehicles relative to charging multiple vehicles in parallel. Further, the chain configuration can reduce the peak load requirements a vehicle charging network of dispensers incurs on a utility grid (e.g., a power grid) when multiple vehicles connect to the charging network for charging at the same time. The chain configuration can provide these advantages because only one vehicle connected to a common chain can be charged at a time, regardless of the number of vehicles that are connected to the chain.

A controller can control which dispensers charge vehicles connected to the chain of dispensers. The controller can determine which dispensers to operate to charge a connected electrical vehicle. The controller can communicate with the dispensers to cause individual dispensers to charge vehicles or remain in a standby state (e.g., connected to an electric vehicle but not charging the electric vehicle) or unused. The controller can operate using a particular function, such as first in-first out, to select which dispensers to control to charge a connected vehicle. The controller may not have access to data that helps determine a priority order of vehicles for charging or may not be able to account for changes in the connected vehicles other than by adding newly connected vehicles to a queue of charging. Without any method of prioritizing vehicles for charging, vehicles that may be needed for traveling more quickly or vehicles with a lower state of charge than other vehicles connected to the chain of dispensers may not be charged until after vehicles that need to be charged with less urgency. Instead, the controller may charge vehicles based on a minimal amount of data, such as the times the different vehicles connected to the chain, which can often result in vehicles being unnecessarily charged or vehicles that need to be charged being left uncharged.

To solve these and other technical challenges, a computer operating for example in a cloud environment can generate and provision a schedule controlling which dispensers of the chain charge electric vehicles over time. The computer can generate the schedule in real-time by collecting the status of the dispensers in the chain indicating which dispensers are connected to electric vehicles or are charging an electric vehicle. The computer can identify the vehicles connected to the dispensers and data about the vehicles (e.g., the current states of charge of the vehicles or dispatch schedules for the vehicles). The computer can execute a function (which can be configured or selected by a user accessing a computing device in communication with the computer) with the data about the vehicles to generate a queue indicating an order to charge the vehicles connected to the chain of dispensers. The computer can transmit the queue in a schedule to a processor of the power cabinet powering the chain of dispensers. The processor can receive the schedule and operate the dispensers on the chain to charge the connected electric vehicles according to the schedule. In this example, the computer can remotely control the charging of electric vehicles connected to the chain of dispensers.

By performing the aforementioned steps, the computer operating in the cloud environment can update the schedule for charging electric vehicles in real-time. For example, the computer can receive indications of new electric vehicles that connect to a dispenser of the chain over time. For each indication, the computer can determine a new queue and transmit the new queue in a new schedule to the power cabinet. The power cabinet can implement the new schedule by charging the electric vehicles connected to the chain according to the new schedule, in some cases by stopping charging of one vehicle to charge a newly connected electric vehicle with a higher charge priority. Accordingly, the computer can facilitate the operation of the chain charging configuration such that high priority electric vehicles are charged regardless of the order in which the vehicles connected to the chain.

FIG. 1 depicts an example system 100, in accordance with present implementations. The system 100 can include a data processing system 102 in communication with a power cabinet 104 or a fleet administrator device 106 over a network 108. The data processing system 102, the power cabinet 104, and the fleet administrator device 106 can be the same as or be similar to the computing system 700, shown and described with reference to FIG. 7. The data processing system 102 can collect data regarding electric vehicles 110 and 112 connected to dispensers 114 and 116 such as the states of charge of the electric vehicles 110 and 112. The dispensers 114 and 116 can be connected (e.g., electrically connected) with a dispenser 118 and any number of other dispensers in a chain of configurations configured to dispense energy to electric vehicles. The electric vehicles 110 and 112 can be vehicles similar to or the same as the electric vehicle 605, shown and described with reference to FIG. 6. The data processing system 102 can collect (e.g., receive or retrieve) a dispatch schedule for the electric vehicles 110 and 112 indicating when the electric vehicles 110 and 112 are scheduled to be traveling (and therefore times by which the electric vehicles 110 and 112 need to be charged). The data processing system 102 can collect such data from the electric vehicles 110 and 112, the dispensers 114 and 116, the power cabinet 104, or the fleet administrator device 106. Based on the collected data, the data processing system 102 can generate a schedule (e.g., a charging schedule) indicating times or an order to charge the electric vehicles 110 and 112. The data processing system 102 can provide or transmit the schedule to the power cabinet 104. The power cabinet 104 can implement the schedule by charging the electric vehicles 110 and 112 one at a time in the order identified in the schedule.

The data processing system 102, the power cabinet 104, or the fleet administrator device 106 can include or execute on one or more processors or computing devices and/or communicate via the network 108. The dispensers 114, 116, and 118 can communicate with computing devices (e.g., the data processing system 102 and the fleet administrator device 106) over the network 108. The network 108 can include computer networks such as the Internet, local, wide, metro, or other area networks, intranets, satellite networks, and other communication networks such as voice or data mobile telephone networks. The network 108 can include computer networks such as the Internet, local, wide, metro, or other area networks, intranets, satellite networks, and other communication networks such as voice or data mobile telephone networks. The network 108 can be used to access information resources such as web pages, websites, domain names, or uniform resource locators that can be presented, output, rendered, or displayed on at least one computing device. For example, via the network 108, the data processing system 102 can communicate with the power cabinet 104 or the fleet administrator device 106 to generate a schedule for charging the vehicles 110 and 112 connected to the dispensers 114 and 116. In another example, via a computing device, a user can communicate over the network 108 with the data processing system 102 to select the function for the data processing system 102 to use to generate a schedule.

The data processing system 102 can include at least one vehicle detector 120. The data processing system 102 can include at least one data collector 122. The data processing system 102 can include at least one power distributor 124. The data processing system 102 can include at least one schedule generator 126. The data processing system 102 can include at least one network connector 128. The data processing system 102 can include at least one data repository 130. The vehicle detector 120, data collector 122, power distributor 124, schedule generator 126, and network connector 128 can each include at least one processing unit or other logic device such as a programmable logic array engine, or module configured to communicate with the data repository 130 or database. The vehicle detector 120, data collector 122, power distributor 124, schedule generator 126, or network connector 128 can be separate components, a single component, or part of the data processing system 102. The data processing system 102 can include hardware elements, such as one or more processors, logic devices, circuits, or memory.

The data repository 130 can include one or more local or distributed databases, and can include a database management system. The data repository 130 can include computer data storage or memory and can store state data 132. The state data 132 can include data regarding the current status of the dispensers 114, 116, and 118. Examples of a status of the dispensers 114, 116, and 118 include charging, standby, and open. The charging state can indicate a dispenser in the charging state is currently connected to and charging a vehicle (e.g., dispensing power to the electric vehicle to charge a battery in the electric vehicle). The standby state can indicate a dispenser in the standby state is currently connected to an electric vehicle but not charging the electric vehicle. The open state can indicate a dispenser in the open state is not currently connected to an electric vehicle. The state data 132 can include data regarding the current state of the dispensers 114, 116, and 118 or data regarding the history of the states of the dispensers 114, 116, and 118.

The data repository 130 can additionally store functions 134. The functions 134 can be different functions the power distributor 124 can use to determine ranks or an order in which to charge or deliver power or energy to electric vehicles. Examples of different functions of functions 134 can include first in first out, equal share, lowest state of charge first, or any other algorithm that can be used to determine ranks or an order in which to charge electric vehicles using dispensers in a chain configuration. The functions 134 can include a machine learning model (e.g., a support vector machine, random forest, neural network, for example) that the power distributor 124 can retrieve and execute to automatically determine the rank or order in which to charge electric vehicles using dispensers in a chain configuration.

The data repository 130 can store schedules 136, and configuration data 138. The schedules 136 can be previously generated schedules for charging electric vehicles connected to a chain of dispensers. The schedule generator 126 can generate such schedules and store copies of the schedules in the data repository 130 as schedules 136. The configuration data 138 can be configuration data for the dispensers 114, 116, and 118 (and any other dispensers of the same chain as the dispensers 114, 116, and 118). Such configuration data can indicate a maximum rate of charge, a total amount energy delivered, for example, for the individual dispensers. The configuration data 138 can also include configuration data for electric vehicles. The configuration data 138 for electric vehicles can include indications of whether the electric vehicles are fleet vehicles, maximum charge rates for the fleet vehicles, maximum charges or charge limits for the electric vehicles, for example. The power distributor 124 can use the configuration data 138 to calculate time periods in which to charge electric vehicles connected to the dispensers 114, 116, and 118.

The fleet administrator device 106 can be a computing device that maintains data regarding a fleet of vehicles that are managed by the same organization or organizations that control or own the power cabinet 104 or the dispensers 114, 116, and 118. The fleet administrator device 106 can store one or more local or distributed databases, such as a dispatch schedule database 140. The dispatch schedule database 140 can include computer data storage or memory and can store dispatch schedules that indicate times or time periods in which to dispatch electric vehicles to various locations. The dispatch schedules can indicate times in which electric vehicles are scheduled to travel or transport individuals to various destinations. The dispatch schedules can include identifications of the electric vehicles, the destinations for the electric vehicles, the times in which the electric vehicles are to arrive at the destination or leave to travel to the destination, or individuals that are scheduled to drive the electric vehicles or that otherwise own the electric vehicles.

The power cabinet 104 can include a primary controller 142, a communications interface 144, and a power module 146. The power cabinet 104 can be or include a container, housing, enclosure or other structure that includes one or more components that can distribute power to dispensers. The power cabinet 104 can be a DC power cabinet that can provide DC energy to the dispensers. The communications interface 144 can be an antenna or other component that allows the primary controller 118 of the power cabinet 104 to communicate over the network 108 with the data processing system 102 or the fleet administrator device 106 or communicate with the dispensers 114, 116, and 118. The power module 146 can be a power module configured to store or otherwise direct energy to a single chain of dispensers including dispensers 114, 116, and 118. The chain of dispensers can include any number of dispensers. The power module 146 can be or include one or more cells and can receive the energy from a renewable energy source or a utility grid. The power cabinet 104 can include any number of power modules that can each be connected to a different chain of dispensers.

The primary controller 142 can include at least one processing unit or other logic device such as a programmable logic array engine, or module configured to communicate with the data processing system 102, the dispensers 114, 116, and 118, and the power module 146. The primary controller 142 can communicate with the data processing system 102 to receive a schedule for operating the chain of dispensers including dispensers 114, 116, and 118. In doing so, the primary controller 142 can control the chain of dispensers such that only one dispenser is delivering power or energy to an electric vehicle connected to a dispenser of the chain at a time. The primary controller 142 can cycle through charging the different electric vehicles that are connected to dispensers of the chain of dispensers according to the schedule. The chain and control configuration can help ensure individual electric vehicles are charged quickly while conserving the strain on the utility grid providing energy to the power cabinet 104 by limiting the maximum amount of power or energy that is required from the grid at a time to the amount of power or energy the power modules of the power cabinet 104 deliver to individual electric vehicles. As described herein, power and energy are used interchangeably for succinctness.

The dispensers 114, 116, and 118 can be dispensers of a chain of dispensers. Although only three dispensers are shown in FIG. 1, any number of dispensers can be connected in the chain of dispensers. The dispensers 114, 116, and 118 can include charge ports 148, 150, and 152, respectively, and charge controllers 154, 156, and 158, respectively. The charge ports 148, 150, and 152 can be ports that electric vehicles can connect to and receive power through. The charge ports 148, 150, and 152 can each include one or more switches that can direct power to electric vehicles connected to the dispensers 114, 116, and 118. As configured in the chain of dispensers, only one charge port of a dispenser of the chain can be configured to dispense energy to an electric vehicle at a time. Accordingly, the switches in the charge ports can be configured such that energy is passed from dispenser to dispenser of the chain until the energy reaches a charge port with a switching configuration that dispenses energy to an electric vehicle.

The primary controller 142 can control the switching configurations of the charge ports 148, 150, and 152. For example, the primary controller 142 can read the schedule the primary controller 142 receives from the data processing system 102 and transmit control signals to the charge controllers 154, 156, and 158 (and controllers of any other dispensers of the chain of configurations). The control signals can indicate a state in which the receiving controller is to operate the dispenser that the controller controls. The charge controllers 154, 156, and 158 can receive the control signals and adjust the switch configurations of the charge ports 148, 150, and 152 based on the control signals such that only one charge port is dispensing energy to an electric vehicle. The primary controller 142 can further control the power module 146 to discharge or otherwise dispense power to the chain of dispensers and charge the electric vehicles connected to the chain.

In operation, the vehicle detector 120 of the data processing system 102 can detect the arrival of the electric vehicle 110 at the dispenser 114. The vehicle detector 120 can receive the indication responsive to the electric vehicle 110 connecting to the dispenser 114. For example, the vehicle detector 120 can receive the indication responsive to a driver plugging a power cord of the dispenser 114 into the electric vehicle 110 to charge the electric vehicle 110. The indication can be an identification that an electric vehicle has connected to a dispenser. The indication can include an identification of the electric vehicle 110 itself (e.g., a unique identifier for the electric vehicle such as a unique identifier (e.g., a vehicle identification number (VIN)) or an account number associated with an account for the electric vehicle that is registered with the data processing system 102). The vehicle detector 120 can receive the indication in a data packet.

The vehicle detector 120 can receive the indication of the arrival of the electric vehicle across the network 108. The vehicle detector 120 can receive the indication from a communication interface (not shown) of the dispenser 114 or from the power cabinet 104 in communication with the dispenser 114 after the dispenser 114 transmits an indication (e.g., an indication including an identification of the arrival of the electric vehicle 110 or the unique identifier for the electric vehicle 110) to the power cabinet 104. For example, after the driver connects the electric vehicle 110 to the dispenser 114, the dispenser 114 can send an indication to the power cabinet 104 and the power cabinet 104 can forward the indication to the vehicle detector 120, or the power cabinet 104 can generate a new indication and provide the new indication to the vehicle detector 120. The dispenser 114 or the power cabinet 104 can provide the indication to the vehicle detector 120 across the network 108. The vehicle detector 120 can operate in a cloud environment receiving data indicating the arrival of electric vehicles at the chain of dispensers connected to the power cabinet 104.

The data collector 122 can determine the statuses of the dispensers 114, 116, and 118 in response to receiving the indication of the arrival of the electric vehicle 110 at the dispenser 114. The data collector 122 can do so in response to receiving the indication of the arrival of the vehicle. To do so, the data collector 122 can retrieve the statuses of the dispensers 114, 116, and 118 by communicating with the dispensers 114, 116, and 118 individually or by communicating with the power cabinet 104. The data collector 122 can identify the retrieved statuses. For example, upon receiving the indication of the arrival of the electric vehicle 110 at the dispenser 114, the data collector 122 can query or communicate with each of the dispensers 114, 116, and 118 of the chain configuration requesting the status (e.g., the current status) of the respective dispensers. In response to receiving the query, the dispensers 114, 116, and 118 can each transmit the status of the respective dispenser to the data collector 122. In another example, the data collector 122 can transmit a request for the statuses of the dispensers 114, 116, and 118 to the power cabinet 104. The power cabinet 104 may have previously received statuses from the dispensers 114, 116, and 118 and stored the statuses in memory (e.g., in the data repository 130 as state data 132). Upon receipt of the request, the power cabinet 104 (e.g., a processor of the power cabinet 104) can retrieve the statuses from memory or from the dispensers 114, 116, and 118 and provide the statuses to the data collector 122. The data collector 122 can receive the statuses from the power cabinet 104 or the dispensers 114, 116, and 118 and store the statuses in memory as state data 132. The data collector 122 can determine which dispensers of the chain configuration are connected to electric vehicles, which dispenser is charging an electric vehicle, or which dispensers are not connected to any electric vehicles.

The data collector 122 can identify a subset of dispensers that are in the charging or the standby state. For instance, the data collector 122 can receive identifications (e.g., unique identifiers) of the electric vehicles 110 and 112 (and any other electric vehicles) that are connected to the dispensers of the chain of dispensers. The data collector 122 can receive the identifications from the power cabinet 104 or the dispensers in response to the same query the data collector 122 transmits to the power cabinet 104 or dispensers or after transmitting a second query requesting data from the dispensers in the standby or charging state. For example, when electric vehicles connect to a dispenser of the chain configuration, the electric vehicles can communicate with the dispenser or the power cabinet 104. In doing so, the electric vehicles can provide data about the electric vehicles such as unique identifiers for the electric vehicles (e.g., identifiers of the vehicles or account numbers associated with accounts registered with the data processing system 102), the current states of charge of the electric vehicles, the maximum charge the batteries of the electric vehicles, the charge limits or charge rate limits for the electric vehicles, for example. Processors in the respective dispensers or the power cabinet 104 can receive the data from the electric vehicles and store the data in memory. Upon receiving the query from the data collector 122, the power cabinet 104 or the dispensers can provide (e.g., include in data packets the power cabinet 104 or the dispensers transmit to the data collector 122) the current status of the dispensers, times in which the electric vehicles connected to a dispenser of the chain of dispensers, identifiers of the dispensers, and any data that is stored about the connected vehicles to the data collector 122 in response to the query.

The data collector 122 can identify the data about the electric vehicles connected to the chain from the data the data collector 122 receives. The data collector 122 can do so in response to querying the power cabinet 104 or the dispensers for the status of the dispensers of the chain of dispensers. The data collector 122 can identify the data by retrieving the data from the data packets the data collector 122 receives.

Upon retrieving the data, the data collector 122 can organize the data into groups that correspond to the individual dispensers and vehicles connected to the dispensers, if any. For example, the chain configuration can include four dispensers connected in the chain configuration, dispenser A, dispenser B, dispenser C, and dispenser D. In response to receiving an indication that vehicle A arrived at or connected to dispenser A, the data collector 122 can retrieve data regarding the status of dispenser B, dispenser C, and dispenser D. In doing so, the data collector 122 can receive an indication that dispenser B is in an open state and not connected to any vehicles, dispenser C is in a charging state and currently charging vehicle C, and dispenser D is in a standby state and connected to but not charging vehicle D. The data collector 122 can receive an indication that dispenser A is in a standby state because while vehicle connected to dispenser A, dispenser A is not dispensing energy to vehicle A. The data collector 122 can also receive data about vehicles A, C, and D including a unique identifiers for the electric vehicles, current states of charge of the electric vehicles, times in which the electric vehicles connected to dispensers of the chain, charge limits of the electric vehicles, or charge rate limits of the electric vehicles. The data collector 122 can retrieve data (e.g., charge limits or charge rate limits) for the dispensers A, C, and D responsive to the dispensers being connected to electric vehicles. The data collector 122 can retrieve such data and format the data such that the data for an electric vehicle and the dispenser to which the electric vehicle is connected is related to each other in some manner (e.g., data identifying and about a dispenser and an electric vehicle connected to the dispenser can be in the same row of a relational database, cache in memory, or data packet). Accordingly, the data collector 122 can retrieve and format the data for different electric vehicles or dispensers in a manner such that the power distributor 124 can determine when and which dispenser to dispense energy to charge connected electric vehicles.

The data collector 122 can determine whether the electric vehicles (e.g., the electric vehicle 110 that arrived at the dispenser 114 or the electric vehicles that were connected to the dispensers of the chain configuration at the time of the arrival) are fleet vehicles. A fleet vehicle can be an electric vehicle that is owned by a business, agency, or other organization. A fleet vehicle can be the only vehicle the organization owns or a fleet vehicle of a group of fleet vehicles owned by the organization. Fleet vehicles can be, for example, large trucks designed to move people or goods, cars (e.g., company cars) that company employees use to travel to different destinations, such as to clients, for example. The fleet vehicles can be registered with the data collector 122 such as to accounts of individuals who have been assigned to use the fleet vehicles.

The data collector 122 can determine whether the electric vehicles are fleet vehicles by identifying the identifiers of the electric vehicles from the data the data collector 122 receives. The data collector 122 can compare the identifiers to identifiers in the configuration data 138 of the data repository that includes a list of fleet vehicles or electric vehicles including fleet vehicles. For example, the data collector 122 can compare the unique identifiers for the electric vehicles 110 and 112 connected to the dispensers 114 and 116 to the list of vehicles. The list of vehicles can include only fleet vehicles or can include vehicles with indications indicating whether the electric vehicles are fleet vehicles or not fleet vehicles. The data collector 122 can determine whether an electric vehicle is a fleet vehicle based on the unique identifier for the electric vehicle matching an identifier on the list or based on the unique identifier matching an identifier on the list that corresponds to a fleet vehicle indication. The data collector 122 can similarly determine whether each electric vehicle connected to a dispenser of the chain configuration and the electric vehicle that arrived at a dispenser are fleet vehicles. In doing so, the data collector 122 can determine whether to query the configuration data 138 of the data repository 130 or the fleet administrator device 106 for further traveling information about the connected electric vehicles (e.g., responsive to the data collector 122 determining an electric vehicle is a fleet vehicle, the data collector 122 can determine more information is available about the electric vehicle and retrieve the further information about the electric vehicle). The data collector 122 can be configured to operate as if every electric vehicle that is connected to the chain of dispensers is a fleet vehicle.

The data collector 122 can retrieve data about the electric vehicle in response to determining the electric vehicle is a fleet vehicle. The data about the electric vehicle can include information indicating times by which the electric vehicles need to be charged, the distances the electric vehicles will need to travel, states of charge of the electric vehicles that are needed to travel the distances (e.g., with a defined buffer), destinations of the electric vehicles, for example. The data collector 122 can use such information to determine times or time periods to charge the electric vehicles connected to dispensers of the chain configuration.

The data collector 122 can retrieve data about the electric vehicle by querying a local database in memory or a remote or external computing device. For example, when querying a local database (e.g., the data repository 130) in memory, the data collector 122 can use the identifier for the electric vehicle as an index in a search through the local database. The data collector 122 can identify a matching identifier from the local database and retrieve the data that corresponds to the matching identifier (e.g., data in the same row or that otherwise has a stored association with the matching identifier). In another example, the data collector 122 can query the fleet administrator device 106. When doing so, the data collector 122 can send a request to the fleet administrator device 106 including the identifier for the electric vehicle and the fleet administrator device 106 can receive and use the identifier as an index in a search in the dispatch schedule database 140. The fleet administrator device 106 can retrieve any data that corresponds to a matching identifier to the index and transmit the retrieved data to the data collector 122. The data collector 122 can similarly retrieve data for each electric vehicle the data collector 122 determines to be a fleet vehicle that is connected to the chain of dispensers.

After the data collector 122 retrieves the data about the newly arrived electric vehicle 110 and the electric vehicles that were previously connected to dispensers of the same chain as the dispenser 114 (e.g., the electric vehicle 112), the power distributor 124 can rank the connected electric vehicles. The power distributor 124 can rank the electric vehicles in a priority order in which higher priority vehicles are ranked higher than lower priority vehicles (e.g., in ascending or descending order). The power distributor 124 can rank the electric vehicles by assigning values to the electric vehicles or the dispensers to which the electric vehicles are connected. The power distributor 124 can assign values to the electric vehicles or dispensers by storing associations between the values and the respective electric vehicles or dispensers in memory.

The power distributor 124 can rank the electric vehicles by executing a function of functions 134. Types of functions 134 can include first in-first out, equal share, or lowest state of charge first, for example. The power distributor 124 can rank the electric vehicles using the first in-first out function by ranking the electric vehicles according to the times in which the electric vehicles connected to the chain of dispensers. In doing so, the power distributor 124 can rank the electric vehicles that connected at an earlier time higher than electric vehicles that connected at a later time. The power distributor 124 can rank the electric vehicles using the equal share function by assigning multiple rankings to each electric vehicle. In doing so, the power distributor 124 can rank the electric vehicles such that the electric vehicles are sequentially charged in set increments of time according to the rankings, in some cases cycling through multiple increments of time for individual electric vehicles, until the electric vehicles are charged. The power distributor 124 can rank the electric vehicles using a lowest state of charge first function by identifying the state of charge of each electric vehicle that is connected to the chain configuration of electric vehicles and ranking the electric vehicles such that electric vehicles with lower states of charge or ranked higher than electric vehicles with higher states of charge. The power distributor 124 can rank the electric vehicles based on any function.

The power distributor 124 can execute the function using the data the power distributor 124 collected regarding the electric vehicles connected to the chain of dispensers. For example, the power distributor 124 can execute the function using the data the power distributor 124 collected for the electric vehicles from the dispensers or the power cabinet 104. For electric vehicles the power distributor 124 determined to be fleet vehicles, the power distributor 124 can additionally or instead execute the function using the data the power distributor 124 retrieved from the data repository 130 or the fleet administrator device 106.

The power distributor 124 can rank the connected electric vehicles by executing a machine learning model. The machine learning model can be trained to receive a feature vector including the data the data collector 122 received or retrieved from various sources regarding connected electric vehicles or the dispensers to which the electric vehicles are connected. In response to execution of the machine learning model, the machine learning model can output rankings for each of the connected electric vehicles or the dispensers to which the electric vehicles are connected. The data collector 122 can retrieve the output rankings from the machine learning model and assign the rankings to the respective electric vehicles or dispensers.

The machine learning model can be trained in real time. The machine learning model can be trained in real time when an administrator views rankings the machine learning model outputs and provides an input indicating which rankings are correct or which rankings are incorrect. The administrator can input the correct rankings for any rankings labeled as incorrect. The machine learning model can receive the input and adjust internal weights or parameters based on any differences between the input and the predicted rankings. The administrator can provide such inputs for each prediction by the machine learning model to train the machine learning model to be more accurate over time.

The power distributor 124 can generate a user interface that an administrator may access at a computing device to control different aspects of the system 100. For example, via the user interface, the administrator may access a platform that enables the administrator to view and edit the queue order of all dispensers connected to the chain of dispensers or the amperage or power level of queued dispensers connected to the power cabinet 104, the amperage or power level of queued dispensers over time (e.g., dispensers can have certain limits from 6-10 PM but different limits from 10 PM to 6 PM). The power distributor 124 can receive the inputs from the administrator and insert them into the data repository 130 such as in the configuration data 138.

In another example, an administrator can input or select the function for the power distributor 124 to execute to rank the electric vehicles via the user interface. For instance, the power distributor 124 can render a user interface on a computing device being accessed by an administrator. The user interface can include a plurality of identifications of functions, such as those described above. Via the user interface, the administrator can select, as an input, a function the administrator prefers for the power distributor 124 to use to determine rankings for electric vehicles that are connected to the chain of dispensers. The power distributor 124 can receive an identification of the selected function. The power distributor 124 can use the selected function to determine rankings for electric vehicles that are connected to the chain of dispensers. An administrator can view and update settings of the system remotely via the data processing system 102 (e.g., via the cloud).

The power distributor 124 can generate a queue. The queue can be an order of charging electric vehicles connected to dispensers of the chain of dispensers. The power distributor 124 can generate the queue using the rankings the power distributor 124 assigned to the electric vehicles or dispensers and identifications of the electric vehicles. The power distributor 124 can generate the queue by formatting the rankings and/or the identifications of the electric vehicles or dispensers in a format that is readable by another computer, such as the power cabinet 104. For example, the power distributor 124 can format the queue by inserting the values of the rankings and the identifications of the electric vehicles and dispensers in individual rows of a table. The rows can be ordered in the order of the rankings such that the primary controller 142 of the power cabinet 104 can read the rows one at a time and charge the electric vehicles connected to the dispensers of the chain configuration according to the order of the rows. The queue can be in any format.

The power distributor 124 can determine time periods for charging the electric vehicles. The time periods can be charging time periods or time periods for charging electric vehicles connected to the chain of dispensers. The power distributor 124 can determine the time periods based on the data the power distributor 124 collects for electric vehicles connected to the dispensers of the chain (e.g., data the power distributor 124 collects from the electric vehicles, the power cabinet 104, the data repository 130, or the fleet administrator device 106). The power distributor 124 can determine such time periods by determining target times for the electric vehicle to be charged or target states of charge for the electric vehicles and determining times to begin charging the electric vehicles such that the electric vehicles have the target states of charge by the target times.

For example, the power distributor 124 can determine target times for the electric vehicles to be charged based on dispatch schedules for the electric vehicles. The power distributor 124 can do so in response to determining the electric vehicles are fleet vehicles (e.g., the data processing system may only determine target times for the electric vehicles to be charged for fleet vehicles). The power distributor 124 can determine the target times for the electric vehicles to be charged by identifying times in which the electric vehicles are scheduled to make deliveries or otherwise travel to other locations (e.g., destinations). For example, the power distributor 124 can identify the dispatch schedules for the electric vehicles and identify the next trip the electric vehicles are scheduled to make or perform. The power distributor 124 can identify the next trip by identifying the current time from an internal clock of the data processing system 102 and identifying a time stamp of a trip on the dispatch schedule closest to the current time. The power distributor 124 can identify the time of the time stamp as the target time for the electric vehicle to be charged. The power distributor 124 can also subtract a defined amount of time or a buffer time from the identified time of the next trip to determine the target time to allow time for real-time changes in charging rate that can cause charging to be slower than anticipated or to enable a driver of the electric vehicle to have extra time to travel to account for traffic or stops along the way. The power distributor 124 can similarly determine target times for any number of fleet vehicles for which the data collector 122 retrieved dispatch schedules.

The power distributor 124 can determine time periods in which to charge the electric vehicles. The power distributor 124 can determine the time periods based on the target times, the states of charge of the electric vehicles, or the charging rates of the electric vehicles. For example, for an electric vehicle, the power distributor 124 can determine an amount of time it will take to charge the electric vehicle to a target state of charge. The target state of charge can be a state of charge equal to the max capacity of the battery of the electric vehicle or a percentage of the max capacity. The target state of charge can be an amount of charge the electric vehicle needs to travel to the destination. The power distributor 124 can determine the amount of charge the electric vehicle needs to travel to the destination by determining the distance between the current location of the electric vehicle and the destination to which the electric vehicle is traveling for the trip (e.g., using a map application) and dividing the distance by a distance per energy used value for the electric vehicle. The power distributor 124 can add a defined amount of charge or energy to the determined amount of charge the electric vehicle needs to travel to the destination to account for any real-world variables that can cause the trip to require more energy than the determined target state of charge.

The power distributor 124 can use the determined target state of charge to determine a time period in which to charge the electric vehicle. The power distributor 124 can divide the target state of charge, which can include the added defined amount of charge, by a charge rate (e.g., the lower of a maximum or set charge rate for the dispenser to which the electric vehicle is connected or a maximum or set charge rate for the electric vehicle) to determine the amount of time the electric vehicle needs to be charged to have the target state of charge for the trip. The power distributor 124 can subtract the determined amount of time from the target time to determine the beginning time to charge the electric vehicle and thus determine the time period as the time between the beginning time and the target time. The power distributor 124 can similarly determine time periods for charging for each electric vehicle for which the power distributor 124 retrieved a dispatch schedule.

The power distributor 124 can determine the time periods based on the constraints an administrator input. For example, an administrator can input the maximum amount of current of all or specific dispensers of the chain. This input maximum can limit the charge rate of the affected dispensers and the power distributor 124 as a maximum responsive to the input limit being lower than the maximum charge rate of the electric vehicle.

In cases in which the power distributor 124 determines there is at least one electric vehicle that is not a fleet vehicle connected to the chain of dispensers, the power distributor 124 can determine amounts of time to charge the non-fleet vehicles. The power distributor 124 can do so by identifying the current state of charge of the non-fleet vehicles and a target state of charge for the electric vehicles. The power distributor 124 can identify the target state of charge of the electric vehicles as the maximum state of charge of the electric vehicles or a defined percentage of the maximum state of charge. The power distributor 124 can determine the difference between the states of charge as the amount of energy that is needed for the electric vehicles. The power distributor 124 can identify the charge rate of the electric vehicles as the lower of a maximum or a set charge rate for the dispensers connected to the electric vehicles and the maximum or a set charge rate of the electric vehicles. The power distributor 124 can divide the amount of energy by the charge rate of the electric vehicles to determine the amount of time to charge the electric vehicles.

The power distributor 124 can determine the time periods for charging based on the rankings for the electric vehicles. For example, after determining the amounts of time the electric vehicles need to be charged to reach target states of charge for trips, the power distributor 124 can set the time periods for charging the electric vehicles based on the rankings for the electric vehicles. The power distributor 124 can do so by sequentially inserting the amounts of time after each other in a queue or sequence of time periods starting with the highest ranked electric vehicle and ending with the lowest ranked electric vehicle. The queue can indicate the dispensers in the ranked order of vehicles connected to the dispensers. In one example, responsive to the current time is 7 AM and vehicle A having a ranking of one with a two hour charging time and vehicle B has a ranking of two with a three hour charging time, the power distributor 124 can determine the charging time period for vehicle A is from 7 AM to 9 AM and the charging time period for vehicle B is from 9 AM to 12 PM. In cases in which a mixture of vehicles that are part of a fleet and vehicles that are not a part of a fleet are connected to the chain of dispensers, the power distributor 124 can sequentially insert the amounts of time into time periods based on the rankings including the fleet and non-fleet vehicles. The power distributor 124 can generate a sequence or queue of charging electric vehicles connected to a chain of dispensers that may only charge one electric vehicle at a time.

The power distributor 124 can adjust the rankings based on the dispatch schedules for the electric vehicles. For example, the power distributor 124 can determine the lengths of times between the current time and the times to begin charging for the electric vehicles connected to the chain of dispensers by subtracting the current times from the times to begin charging. The power distributor 124 can increase the rankings of electric vehicles that the power distributor 124 determines to have short lengths of time (e.g., cause the electric vehicles that are scheduled to be dispatched a time below a threshold from the current time to be scheduled to be charged earlier) and decrease the rankings of electric vehicles that the power distributor 124 determines to have long lengths of time (e.g., cause the electric vehicles that are scheduled to be dispatched above a threshold from the current time to be scheduled to be charged later). In another example, the power distributor 124 can adjust the rankings based on the distances the electric vehicles are scheduled to travel. The power distributor 124 can increase the rankings of electric vehicles that the power distributor 124 determines to have further distances to drive (e.g., distances above a threshold) and decrease the rankings of electric vehicles that have shorter distances to drive (e.g., distances below a threshold). The power distributor 124 can identify the distances and rank the electric vehicles order the rankings based on the distances (e.g., the power distributor 124 can rank electric vehicles that are scheduled to travel further higher). Accordingly, the power distributor 124 can set time periods for charging taking into accounts the times in which electric vehicles need to be charged according to their dispatch schedule.

An administrator can adjust the rankings or times periods after the power distributor 124 determines the rankings. For example, the power distributor can determine the rankings or time periods for the electric vehicles and transmit the rankings or time periods with identifications of the corresponding vehicles to a computing device being accessed by an administrator. The administrator can view the rankings or time periods on a user interface and adjust the rankings or time periods of the different vehicles as the administrator sees fit. The computing device can transmit the adjusted rankings or time periods back to the power distributor 124 and the schedule generator 126 can use adjusted rankings to generate a schedule.

The schedule generator 126 can generate a schedule. The schedule can be a record (e.g., a file, document, table, listing, message, notification, for example) that includes the queue or the time periods for delivering power to dispensers to charge the electric vehicles connected to the dispensers. The schedule can include both the queue and the time periods. The schedule generator 126 can generate or configure the schedule by adding the queue including the identifications of electric vehicles or dispensers and the assigned rankings to the record. The schedule generator 126 can add the time periods for delivering power to the electric vehicles to the record. The schedule generator 126 can generate a machine-readable schedule that the power cabinet 104 can use to determine the dispensers to which to deliver power or energy and when to deliver the power or energy.

The schedule generator 126 can provide the schedule to the power cabinet 104 through the network connector 128. The network connector 128 can be an application programming interface (API) that enables communication over the network 108. The network connector 128 can facilitate all communications between components of the data processing system 102 across the network 108. The network connector 128 can transmit the schedule (e.g., the record containing the schedule) in one or more data packets to the primary controller 142 of the power cabinet 104. The primary controller 142 can receive the schedule and store the schedule in memory, such as in a cache. The primary controller 142 can then control delivery of power to the dispensers such that only one dispenser is in a charging state at a time according to the rankings or time periods of the schedule.

The primary controller 142 can control delivery of power to the dispensers by identifying the ranking or the time periods on the schedule. The primary controller 142 can identify the ranking and the time periods from the schedule. For instance, in cases in which the schedule only includes rankings, the primary controller 142 can deliver energy to (e.g., control the power module 146 to dispense energy to) the highest ranked dispensers first in descending order. The primary controller 142 can communicate with the electric vehicles being charged or the dispensers charging the electric vehicles to determine when the electric vehicles have been charged to a limit (e.g., set limits or maximum charging limits of the electric vehicles). Upon determining an electric vehicle has been charged to a limit, the primary controller 142 can identify the next highest ranked electric vehicle from the schedule and dispense energy to the identified electric vehicle. In cases in which the schedule includes time periods for charging the electric vehicles, the primary controller 142 can deliver energy to the dispensers according to the schedule. For example, the primary controller 142 can deliver energy to an electric vehicle for a time period, detect when the time period is over, identify the electric vehicle that is associated with charging for the next time period, and deliver energy to the next electric vehicle.

The schedule can cause the power cabinet 104 to stop charging an electric vehicle to charge another electric vehicle connected to the chain configuration. For example, the dispenser 116 of the chain configuration can be in a charging state delivering energy to the electric vehicle 112 when the electric vehicle 110 connects to the dispenser 114. Vehicle detector 120 can detect the arrival of the electric vehicle 110 and operate in tandem with the data collector 122, the schedule generator 126, the power distributor 124, and the network connector 128 to generate a schedule for charging electric vehicles that indicates to charge the electric vehicle 110 immediately. The primary controller 142 can receive the new schedule and replace (e.g., replace in memory) the schedule the primary controller 142 was previously using to determine which electric vehicle to charge with the new schedule. The primary controller 142 can identify the dispenser 114 as the dispenser to which to deliver power or energy to charge the newly arrived electric vehicle 110. Accordingly, because the chain configuration may only enable the power cabinet 104 to deliver power or energy to one dispenser of the chain at a time, the primary controller 142 can stop delivering power to the dispenser 116 and begin delivering energy to the dispenser 114 based on the higher ranking of the dispenser 114 or the electric vehicle 110.

The data processing system 102 can generate schedules for charging electric vehicles connected to the chain of dispensers over time. For example, the data processing system 102 can receive multiple indications of vehicles connecting to the chain of vehicles over time. For each indication, the data processing system 102 can determine a new schedule for charging and transmit the new schedule to the power cabinet 104. The power cabinet 104 may receive each schedule and replace the schedule the power cabinet 104 was previously operating on with the new schedule. The data processing system 102 and power cabinet 104 can operate to ensure the highest priority electric vehicles are charged using a daisy chain configuration of dispensers in which only one dispenser can deliver energy at a time.

The data processing system 102, or one or more components of the data processing system 102, can operate inside or be local to the power cabinet 104. For example, instead of receiving the indication that an electric vehicle arrived at a dispenser from the power cabinet 104, the data processing system 102 can receive the indication directly from the dispenser. The data processing system 102 can then generate a schedule containing a queue of electric vehicles to charge or time periods for charging the electric vehicles. The data processing system 102 can then control the power module 146 to deliver energy to the dispensers of the chain of dispensers according to the schedule. The data processing system 102 can do so by transmitting control signals to the different dispensers of the chain of dispensers to set which dispenser is dispensing energy to a connected electric vehicle or controlling the power module 146 to deliver energy to the chain of dispensers.

The data processing system 102 can generate queues or schedules that causes the power cabinet 104 to deliver energy to multiple electric vehicles at a time. For example, the data processing system 102 can store a number of vehicles to which the power cabinet 104 can deliver energy at a time in memory. The data processing system 102 can use execute one of the functions 134 to calculate rankings for the vehicles that are connected to the dispensers. The data processing system 102 can determine time periods for charging the vehicles using the methods described herein but such that there are overlapping time periods in cases in which the power cabinet 104 is scheduled to deliver energy to multiple vehicles at a time. The data processing system 102 can determine such overlapping time periods by identifying the rankings for the vehicles and determining time periods for charging the highest ranked vehicles in descending order. The data processing system 102 can do so such that the power cabinet 104 is scheduled to deliver energy to no more than the number of vehicles equal to the number the data processing system 102 stored in memory.

For example, the data processing system 102 can store a number indicating the power cabinet 104 can charge four electric vehicles at a time. The data processing system 102 can determine time periods for charging four vehicles connected to four dispensers of the chain of dispensers that are ranked the highest of the vehicles connected to the chain of dispensers. The data processing system 102 can do so such that the time periods overlap with each other and the power cabinet 104 operating according to the schedule would deliver energy to each of the four vehicles. The data processing system 102 can identify the time period that ends the earliest of the four time periods. The data processing system 102 can determine a time period for a fifth electric vehicle as the amount of time that is needed to charge the fifth vehicle beginning at the end of the time period that ends the earliest of the four time periods. The data processing system 102 can iteratively determine time periods for charging electric vehicles connected to the chain of dispensers until determining a time period for charging each vehicle connected to the chain of dispensers. The data processing system 102 can transmit the generated schedule with the time periods or rankings to the power cabinet 104 and the power cabinet can deliver energy to the chain of dispensers according to the schedule.

The power cabinet 104 can deliver energy to multiple electric vehicles connected to the same chain of dispensers at a time. For example, the power cabinet 104 can deliver energy to four vehicles at a time. The power cabinet 104 can receive a schedule of queued electric vehicles connected to the chain of dispensers without time periods. The power cabinet 104 can deliver energy to four electric vehicles connected to the chain of dispensers at a time according to the rankings of the queue (e.g., starting with the highest ranked electric vehicle). The power cabinet 104 can do so until the individual vehicles are charged to a limit for the electric vehicles (e.g., to a maximum battery capacity, to a preset limit, or until receiving an indication from the respective vehicles or the dispensers to which the vehicles are connected indicating the vehicles are charged to a limit). Upon charging a vehicle to a limit, the power cabinet 104 can identify the next highest ranked electric vehicle from the queue and deliver energy to the identified electric vehicle while continuing delivering energy to the other electric vehicles. The power cabinet 104 can continue cycling through delivering energy to the individual vehicles until each vehicle connected to the chain of dispensers is charged to the electric vehicle's limit.

Figure 2:
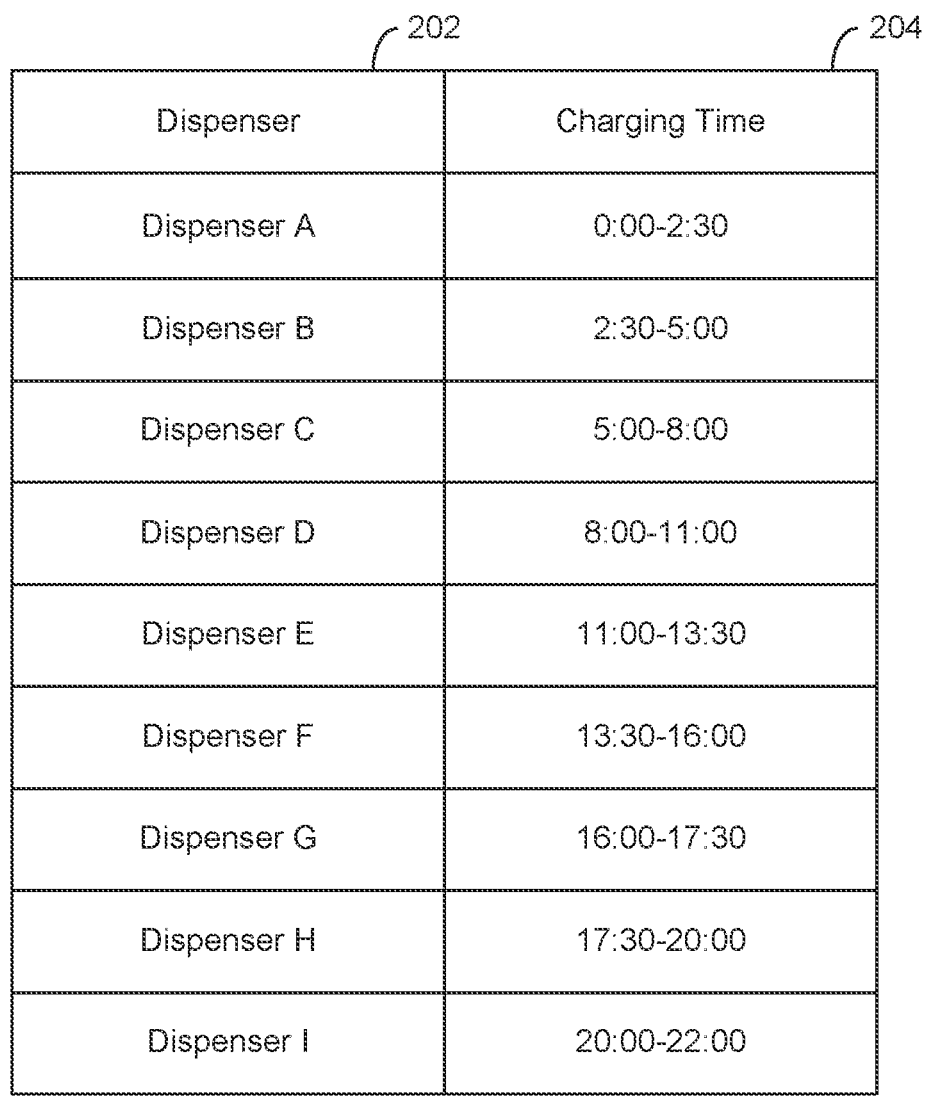
FIG. 2 depicts a schedule for charging vehicles, in accordance with present implementations.

FIG. 2 depicts an example schedule 200, in accordance with present implementations. Schedule 200 can be or include a schedule that a computer (e.g., data processing system 102) transmits to a power cabinet (e.g., power cabinet 104) to control a chain of dispensers (e.g., dispensers 114, 116, and 118). As illustrated, schedule 200 can be a table that includes a dispenser column 202 and a charging time column 204. The schedule 200 can be organized in any manner (e.g., dispenser column 202 and charging time column 204 can be rows instead of columns or generated in a graph configuration). Dispenser column 202 can include identifications of specific dispensers to activate to charge an electric vehicle connected to the dispenser. For example, dispenser column 202 can include identifications of dispensers of a chain as separate strings that correspond to the names of the dispensers. Charging time column 204 can include time periods for charging the electric vehicles connected to the corresponding dispensers. The time periods can be set time periods (e.g., each time period can be the same) or vary depending on the time period that the data processing system calculated. The time periods of the charging time column 204 can correspond to specific dispensers such as by being in the same row as a dispenser in dispenser column 202 for which the data processing system determined the time period. Accordingly, when the power cabinet receives the schedule 200, the power cabinet can determine the dispensers to deliver power or energy and the time periods to deliver such power to charge electric vehicles connected to the chain of dispensers.

The schedule 200 can include an order of delivering power or energy to dispensers without time periods to deliver the power or energy. For example, the data processing system can determine a queue that indicates an order in which to charge electric vehicles connected to dispensers of the chain configuration dispensers. The order can be a priority order in which the electric vehicles that are needed to be charged earlier or first can have a higher priority and therefore an earlier place in the queue. The data processing system can include the queue order in the schedule 200 by placing the order of dispensers in sequential order within a table or by including numerical identifiers of the place within the queue of the dispensers in the schedule 200. The controller of the power cabinet can receive the schedule 200 in such a configuration and dispense energy to the dispensers until the electric vehicles attached to the dispensers are fully charged (or are charged to a defined percentage of a full charge) in the order identified in the schedule 200 one at a time until every vehicle connected to the dispensers identified on the schedule 200 is fully charged or charged to a defined percentage of a full charge.

Figure 3:
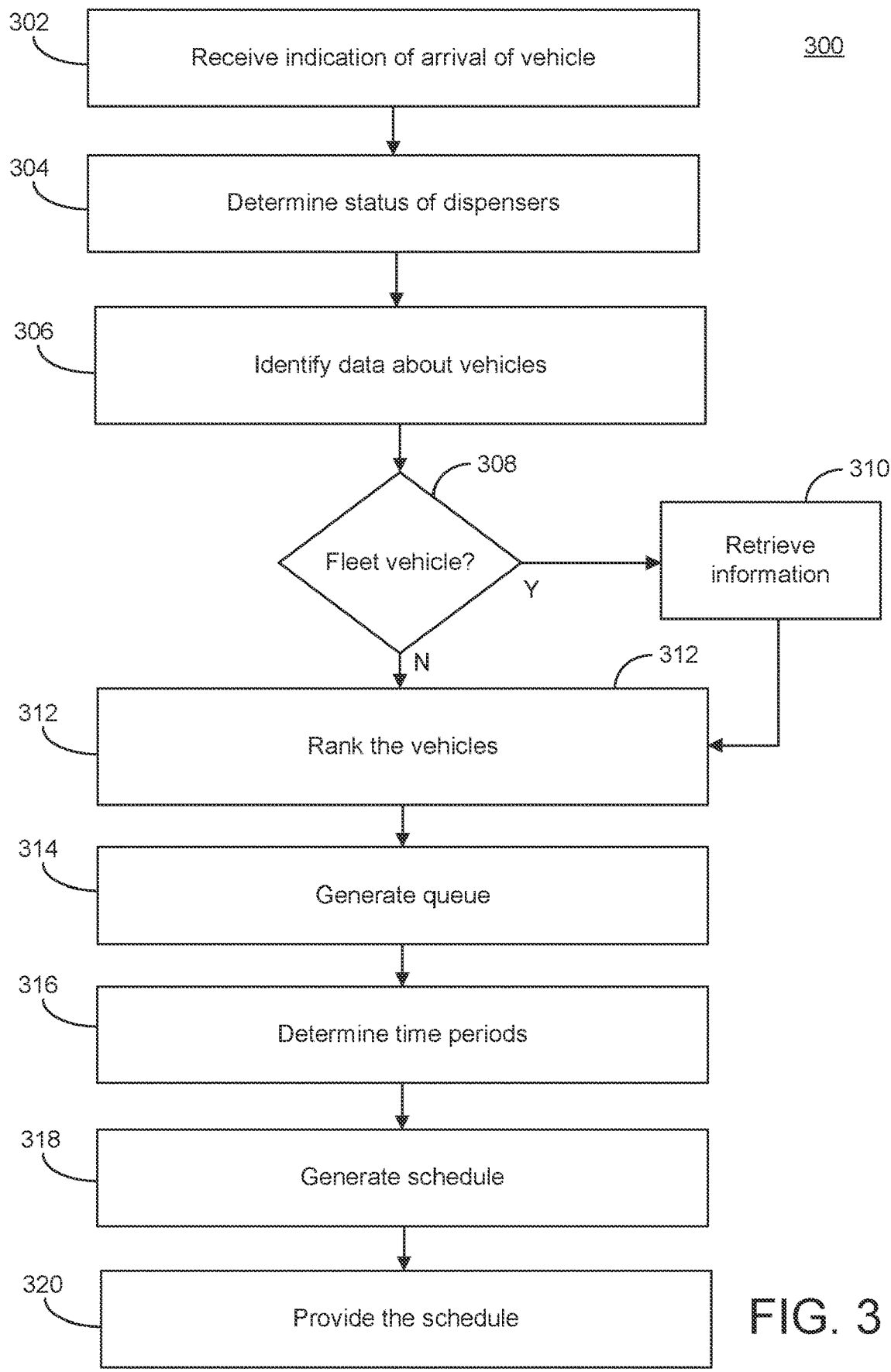
FIG. 3 depicts a method of cloud-based energy management of daisy chain charging, in accordance with present implementations.

FIG. 3 depicts a method 300 of cloud-based energy management of daisy chain charging, in accordance with present implementations. The method 300 can be performed by one or more components depicted in the system 100 of FIG. 1 or computing device 700 of FIG. 7. For example, the method 300 can be performed by a data processing system (e.g., data processing system 102, shown and described with reference to FIG. 1). Performance of method 300 can allow the data processing system to control a chain of dispensers across a network. The data processing system can control the dispensers based on data the data processing system receives from the sensors themselves, based on data the data processing system processing system has stored regarding the electric vehicles connected to the sensors, or based on data the data processing system retrieves from a computing device regarding such vehicles. The data processing system can generate a schedule for charging the electric vehicles connected to the dispensers based on the data such that the electric vehicles connected to the dispensers are charged to meet fleet management needs (e.g., the data processing system can generate the schedule such that vehicles scheduled to deliver a product at a certain time are sufficiently charged to make the delivery) or based on any other criteria. The data processing system can operate in a cloud environment and can be operable by a user such that the user can configure or select the function the data processing system uses to generate the schedule. The data processing system can then provide (e.g., transmit) the schedule to a power cabinet (e.g., a DC power cabinet) controlling distribution of energy to the dispensers. The data processing system can generate or transmit such schedules each time a new vehicle connects to a dispenser of the chain of dispensers. The data processing system can remotely update energy management operations of a power cabinet that controls the daisy configuration hardware in real-time. Performance of the method 300 can also enable the data processing system to have more minute control of energy the power cabinet distributes, providing energy savings.

At ACT 302, the method 300 can include receiving an indication of an arrival of a vehicle (e.g., an electric vehicle). The data processing system can detect the arrival of the vehicle at a dispenser (e.g., an electricity dispenser) connected in a chain of dispensers. The data processing system can receive the indication responsive to the vehicle connecting to the dispenser. For example, the data processing system can receive the indication responsive to a driver plugging a power cord of the dispenser into the electric vehicle to charge the electric vehicle. The indication can be an identification that the vehicle has connected to the dispenser. The indication can include an identification of the vehicle itself (e.g., a unique identifier for the vehicle such as vehicle identification number (VIN) or an account number associated with an account for the vehicle that is registered with the data processing system).

At ACT 304, the method 300 can include determining the statuses (e.g., the states) of the dispensers of the chain of dispensers. The data processing system can determine the statuses of the dispensers in response to receiving the indication of the arrival of the vehicle at a dispenser. Examples of statuses for the dispensers include charging, standby, and open. To determine the statuses, the data processing system can retrieve the statuses of the dispensers by communicating with the dispensers individually or by communicating with the power cabinet. For example, upon receiving the indication of the arrival of the vehicle at a dispenser, the data processing system can query or communicate with each of the dispensers of the chain configuration by requesting the status (e.g., the current status) of the dispenser. In response to receiving the query, the dispensers can each transmit the status of the respective dispensers to the data processing system. The power cabinet may have previously received statuses from the dispensers and stored the statuses in memory. Upon receipt of the request, the power can retrieve the statuses from memory and provide the statuses to the data processing system. The data processing system can receive the statuses from the power cabinet or the dispensers and store the statuses in memory (e.g., in a database or in a cache).

The data processing system can identify a subset of dispensers that are in the charging or the standby state. The data processing system can do so by identifying or generating a list of dispensers with the retrieved status from each dispenser of the chain. The data processing system can filter out or remove the dispensers that have an open status from the list because such dispensers are not currently candidates for dispensing energy to any vehicles (e.g., dispensers in the open status are not connected to any vehicles and therefore are not candidates to be scheduled to dispense energy). The data processing system can identify the remaining dispensers on the list as a subset of dispensers that are connected to vehicles. In doing so, the data processing system can identify dispensers to schedule to dispense energy.

At ACT 306, the method 300 can include identifying data (e.g., information) about the vehicles. The data processing system can identify the data about the vehicles from the data the data processing system receives in response to querying the power cabinet or the dispensers for the statuses of the dispensers of the chain. In cases in which the data processing system queries the dispensers, the data processing system may only query the dispensers identified as being in the charging or the standby state. The data processing system can receive data packets including the data about the vehicles in response to the queries to the power cabinet or the dispensers. The data processing system can identify the data about the vehicles by retrieving the data from the data packets. Upon receiving and retrieving the data from the data packets, the data processing system can store the data in memory to enable the data processing system to later analyze the data to determine how to rank or determine time periods for charging the connected vehicles.

At ACT 308, the method 300 can include determining that the vehicles (e.g., the vehicle that arrived at the dispenser or the vehicles that were connected to the dispensers of the chain configuration at the time of the arrival) are fleet vehicles. The data processing system can determine that the vehicles are fleet vehicles by identifying the identifiers of the vehicles from the data the data processing system receives. The data processing system can compare the identifiers to identifiers in a database that includes a list of fleet vehicles or vehicles including fleet vehicles. The data processing system can determine a vehicle is a fleet vehicle based on the unique identifier for the vehicle matching an identifier on the list or based on the unique identifier matching an identifier on the list that corresponds to a fleet vehicle indication. In doing so, the data processing system can determine whether or not to query a remote or local database for further traveling information about the vehicles (e.g., responsive to the data processing system determining that a vehicle is a fleet vehicle, the data processing system can determine more information is available about the vehicle and retrieve the further information about the vehicle). The data processing system can determine or assume every vehicle that is connected to the chain of dispensers is a fleet vehicle.

At ACT 310, the method 300 can include retrieving data about the vehicle. For example, the data processing system can retrieve data about the vehicle in response to determining the vehicle is a fleet vehicle. The data about the vehicle can be information indicating times by which the vehicles need to be charged, the distances the vehicles will need to travel, states of charge of the vehicles needed to travel the distances (e.g., with a defined buffer), destinations of the vehicles, for example. The data processing system can use such information to determine times or time periods to charge vehicles connected to dispensers of the chain configuration to ensure the vehicles can travel according to the dispatch schedule.

At ACT 312, the method 300 can include ranking the vehicles. The data processing system can rank the vehicles that are connected to the chain of dispensers. The data processing system can rank the vehicles that are connected to dispensers that the data processing system identified as being in the standby or charging state. The data processing system can rank the vehicles in a priority order in which higher priority vehicles are ranked higher than lower priority vehicles (e.g., in ascending or descending order). The data processing system can rank the vehicles by assigning values to the vehicles or the dispensers to which the vehicles are connected. The data processing system can assign values to the vehicles or dispensers by storing associations between the values and the respective vehicles or dispensers.

The data processing system can rank the vehicles by executing a function. Such functions can include first in-first out, equal share, lowest state of charge first, for example. The data processing system can rank the vehicles based on any function. The data processing system can execute the function using the data the data processing system collected regarding the vehicles connected to the chain of dispensers. For example, the data processing system can execute the function using the data the data processing system collected for the vehicles from the dispensers or the cabinet. For vehicles the data processing system determined to be fleet vehicles, the data processing system can additionally or instead execute the function using the data the data processing system retrieved from a local database or the remote or external database.

At ACT 314, the method 300 can include generating a queue. The queue can be an order of charging vehicles connected to dispensers of the chain of dispensers. The data processing system can generate the queue using the rankings the data processing system assigned to the vehicles or dispensers and identifications of the vehicles. The data processing system can generate the queue by formatting the rankings and/or the identifications of the vehicles or dispensers in a format that is readable by another computer, such as the power cabinet controlling the dispensers. For example, the data processing system can format the queue by inserting the values of the rankings and the identifications of the vehicles and dispensers in individual rows of a table. The rows can be ordered in the order of the rankings such that the power cabinet can read the rows one at a time and charge the vehicles connected to the dispensers of the chain configuration according to the order of the rows. The queue can be in any format.

At ACT 316, the method 300 can include determining time periods. The time periods can be charging time periods or time periods for charging vehicles connected to the chain of dispensers. The data processing system can determine the time periods. The data processing system can determine the time periods based on the data the data processing system collects for vehicles connected to the dispensers of the chain configuration (e.g., data the data processing system collects from the vehicles, the power cabinet, local memory, or the external or remote computing device). The data processing system can determine such time periods by determining target times for the vehicle to be charged or target states of charge for the vehicles and determining times to begin charging the vehicles such that the vehicles have the target states of charge by the target times.

For example, the data processing system can determine target times for the vehicles to be charged based on dispatch schedules for the vehicles. The data processing system can do so in response to determining the vehicles are fleet vehicles (e.g., the data processing system may only determine target times for the vehicles to be charged for fleet vehicles). The data processing system can determine the target times for the vehicles to be charged by identifying times in which the vehicles are scheduled to make deliveries or otherwise travel to other locations. For example, the data processing system can identify the dispatch schedules for the vehicles and identify the next trip the vehicles are scheduled to make or perform. The data processing system can identify the next trip by identifying the current time from an internal clock of the data processing system and identifying a time stamp of a trip on the dispatch schedule closest to the current time. The data processing system can identify the time of the time stamp as the target time for the vehicle to be charged. The data processing system can similarly determine target times for fleet vehicles for which the data processing system retrieved dispatch schedules.

The data processing system can determine time periods in which to charge the vehicles. The data processing system can determine the time periods based on the target times, the state of charge of vehicles, or a charging rate of the vehicles. For example, for a vehicle, the data processing system can determine an amount of time it will take to charge the vehicle to a target state of charge. The target state of charge can be a state of charge equal to the max capacity of the battery of the vehicle or a percentage of the max capacity.

The target state of charge can be an amount of charge the vehicle needs to travel to a destination. The data processing system can determine the amount of charge the vehicle needs to travel to the destination by determining the distance between the current location of the vehicle and the destination to which the vehicle is traveling for trip (e.g., using a map application) and dividing the distance by distance per energy used value for the vehicle. The data processing system can divide the determined amount of charge by a charge rate (e.g., the lower of a maximum or set charge rate for the dispenser to which the vehicle is connected or a maximum or set charge rate for the vehicle) to determine the amount of time the vehicle needs to be charged to have the target state of charge for the trip. The data processing system can subtract the determined amount of time from the target time to determine the beginning time to charge the vehicle and thus determine the time period as the time between the beginning time and the target time. The data processing system can similarly determine time periods for charging for each vehicle for which the data processing system retrieved a dispatch schedule.

In cases in which the data processing system determines there is at least one vehicle that is not a fleet vehicle connected to the chain of dispensers, the data processing system can determine amounts of time to charge the non-fleet vehicles. The data processing system can do so by identifying the current state of charge of the non-fleet vehicles and a target state of charge for the vehicles. The data processing system can identify the target state of charge of the vehicles as the maximum state of charge of the vehicles or a defined percentage of the maximum state of charge. The data processing system can determine the difference between the states of charge as the amount of energy that is needed for the vehicles. The data processing system can identify the charge rate of the vehicles as the lower of a maximum or set charge rate for the dispensers connected to the vehicles and the maximum or set charge rate of the vehicles. The data processing system can divide the amount of energy that is by the charge rate of the vehicles to determine the amount of time to charge the vehicles.

The data processing system can determine the time periods for charging based on the rankings for the vehicles. For example, after determining the amounts of time the vehicles need to be charged to reach target states of charge for trips, the data processing system can set the time periods for charging the vehicles based on the rankings for the vehicles. The data processing system can do so by sequentially inserting the amounts of time after each into a sequence of time periods starting with the highest ranked vehicle and ending with the lowest ranked vehicle. In cases in which a mixture of vehicles that are part of a fleet and vehicles that are not a part of a fleet are connected to the chain of dispensers, the data processing system can sequentially insert the amounts of time into time periods based on the rankings including the fleet and non-fleet vehicles. The data processing system can generate a sequence or queue of charging vehicles connected to a chain of dispensers that may only charge one vehicle at a time.

At ACT 318, the method 300 can include generating a schedule. The schedule can be a record that includes the queue or the time periods for delivering power or energy to dispensers to charge the vehicles connected to the dispensers. The data processing system can generate or configure the schedule by adding the queue including the identifications of vehicles or dispensers and the assigned rankings to the record. The data processing system can also add the time periods for delivering power or energy to the vehicles to the record.

At ACT 320, the method 300 can include providing the schedule. The data processing system can provide the schedule to the power cabinet coupled to and controlling the chain of dispensers. The data processing system can do so by transmitting the schedule in one or more data packets to a processor of the power cabinet. The processor of the power cabinet can receive the schedule and store the schedule in memory, such as in a cache. The processor of the power cabinet can then deliver power or energy to the dispensers such that only one dispenser is in a charging state at a time according to rankings or times of the schedule.

Figure 4:
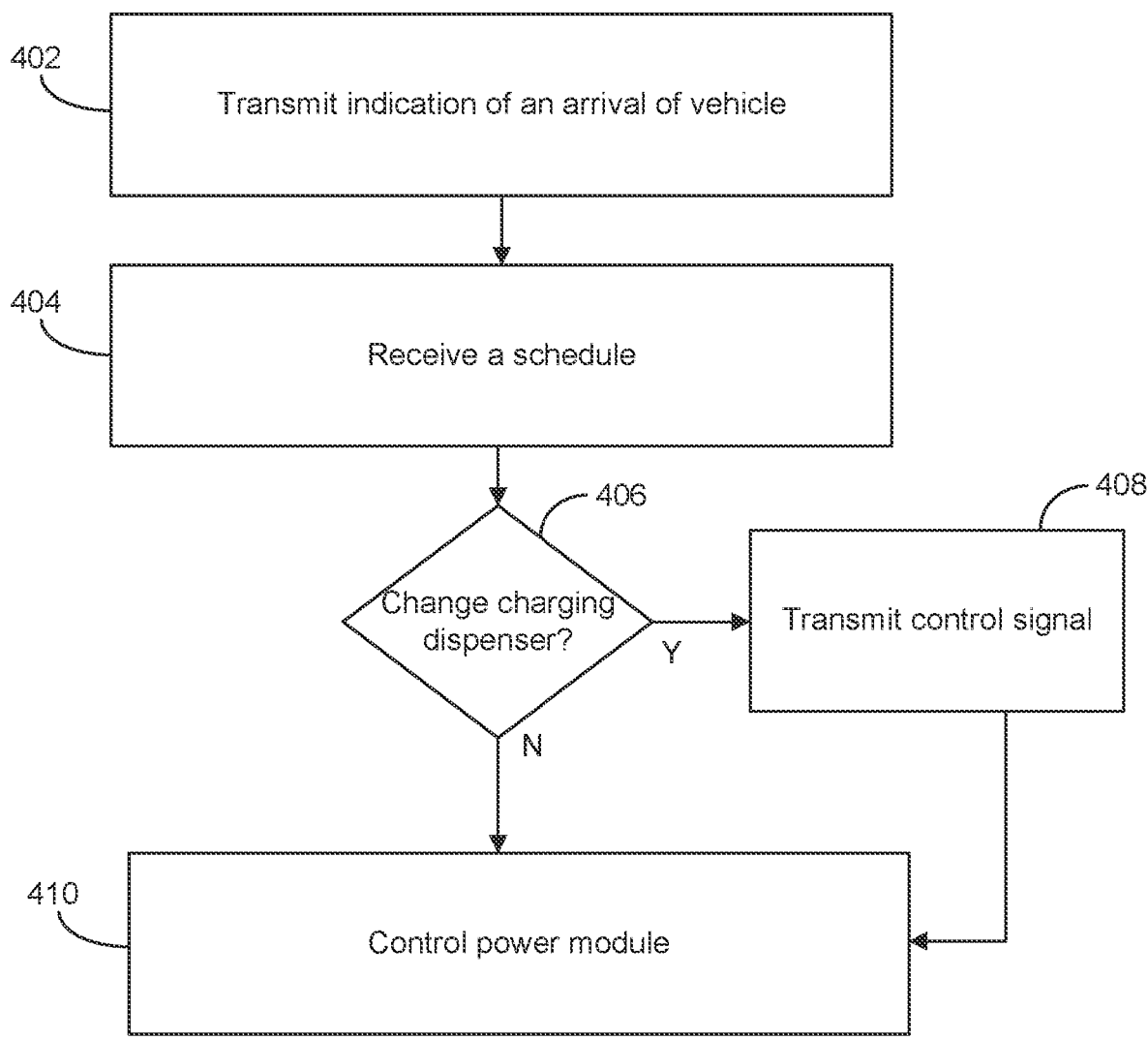
FIG. 4 depicts a method of cloud-based energy management of daisy chain charging, in accordance with present implementations.

FIG. 4 depicts another method of cloud-based energy management of chain charging, in accordance with present implementations. The method 400 can be performed by components depicted in the system 100 of FIG. 1. For example, the method 400 can be performed by a data processing system (e.g., data processing system 102, shown and described with reference to FIG. 1). The method 400 can be performed by a power cabinet (e.g., a processor via a memory or communication interface of power cabinet 104, shown and described with reference to FIG. 1). Performance of method 400 can enable the power cabinet to control a chain of dispensers (e.g., electricity dispensers) by only distributing energy to one dispenser of the chain at a time according to a schedule received across a network from a computer. The power cabinet can adjust the dispensers to which the power cabinet distributes energy in real-time as the computer generates new schedules and provides the schedules to the power cabinet.

At ACT 402, the method 400 can include transmitting an indication of an arrival of an electric vehicle. The power cabinet can transmit the indication of an arrival of a vehicle. The power cabinet can transmit the indication of an arrival of a vehicle in response to detecting the arrival of a vehicle at a dispenser of chain of dispensers the power cabinet controls. The arrival can be a connection of the vehicle at the dispenser. The power cabinet can receive an indication of the arrival of the vehicle from the dispenser itself upon the vehicle connecting to the dispenser. The indication from the vehicle can include an identification that the vehicle arrived at the dispenser or any data the vehicle transmitted to the dispenser upon connecting (e.g., current state of charge, a unique identifier for the vehicle, for example) or an identification of the dispenser. The vehicle or the dispenser can communicate the data about the vehicle to the power cabinet in response to the power cabinet transmitting a request for such data to the dispenser or the vehicle. The power cabinet can forward or generate a new data packet comprising the indication or the data about the vehicle or the dispenser to a data processing system (e.g., data processing system 102, shown and described with reference to FIG. 1).

After transmitting the indication of the arrival of the vehicle to the data processing system, the power cabinet can receive a request for data from the data processing system. The request can be a request for data regarding the status of the dispensers of the chain of dispensers the power cabinet controls. In response to receiving the request, the power cabinet can query the dispensers for the statuses of the dispensers (e.g., transmit requests to the dispensers for their statuses) and receive responses indicating whether the dispensers are in the charging state, the standby state, or the open state. The power cabinet can maintain a database in memory with status indicators indicating the status of the dispensers of the chain of dispensers. The power cabinet can update the statuses of the dispensers within the database over time as the statuses of the dispensers change. For example, the power cabinet can update the statuses according to a schedule the power cabinet is currently using to control distribution of energy to the dispensers. In another example, the dispensers can automatically transmit indications of their new statuses as their statuses change (e.g., a dispenser can transmit an indication of an open state after a vehicle disconnects from the dispenser or an indication of a standby state after a vehicle connects to the dispenser) to the power cabinet. As the power cabinet receives the indications, the power cabinet can update the database with the new statuses of the dispensers. Accordingly, because the statuses are updated in real-time, upon receipt of a request for the current status of the dispensers of the chain of dispensers, the power cabinet can retrieve the statuses from the database and transmit the statuses to the data processing system.

The power cabinet can receive a request for data regarding the vehicles connected to the dispensers or the dispensers themselves. The power cabinet can receive the request from the data processing system. In response to receiving the request, the power cabinet can retrieve the data from the vehicles or the dispensers (e.g., data about the vehicles such as a current state of charge of the vehicle, a unique identifier for the vehicle, a maximum or set charge rate for the vehicle or dispenser, for example). The power cabinet can receive such data when the vehicles connect to the dispensers and the power cabinet can store the data in a database. The power cabinet can receive or retrieve the requested data from the vehicles, dispensers, or database and transmit the requested data to the data processing system for processing to generate a schedule for charging.

At ACT 404, the method 400 can include receiving a schedule. The power cabinet can receive the schedule. The power cabinet can receive the schedule from the data processing system. The power cabinet can receive the schedule after the data processing system generates the schedule using data regarding the vehicles connected to dispensers of the chain of dispensers according to the ACTS of method 300. Upon receipt of the schedule, the power cabinet can store the schedule in memory.

At ACT 406, the method 400 can include determining that the schedule indicates to change distribution of energy to a different dispenser at the current time. The power cabinet can determine the schedule indicates to change distribution of energy to a different dispenser. The power cabinet can do so by identifying the highest ranked vehicle or dispenser or the vehicle or dispenser with the earliest time period on the schedule. The power cabinet can compare an identifier of the identified vehicle or dispenser to the database indicating the current status of each of the dispensers. Based on the comparison, the power cabinet can determine the matching vehicle or dispenser matches the dispenser to which the power is currently distributing energy. Responsive to determining the power cabinet is current distributing energy to the identified vehicle from the schedule, the power cabinet can determine a change in distribution is not currently required. Otherwise, the power cabinet can determine a change in distribution is required.

At ACT 408, the method 400 can include transmitting control signals to change distribution of energy. In response to determining the power cabinet is distributing energy to a different vehicle or dispenser, can transmit a control signal to stop distributing energy to the vehicle or dispenser. To do so, for example, the power cabinet can transmit a signal that changes the position of the switch of the dispenser dispensing energy to a vehicle to cause the dispenser to stop dispensing energy (e.g., to cause the dispenser to stop dispensing energy and directing the energy to another dispenser of the chain of dispensers). The power cabinet can then transmit a control signal to the dispenser identified from the schedule to change the state of the switch of the dispenser to distribute energy to a vehicle. Responsive to another dispenser was charging a vehicle at the same time, the power cabinet can additionally send a control signal to that dispenser to change the state of the switch to stop distributing energy to the vehicle. The power cabinet can operate the dispensers of the chain of dispensers such that only one dispenser dispenses energy at a time.

At ACT 410, the method 400 can include controlling the power module. The power cabinet can control the power module to deliver power to the chain of dispensers. The power cabinet can control delivery of power to the chain of dispensers according to the schedule the power cabinet received from the data processing system. The power cabinet can control the power module to deliver power to only one dispenser at a time in accordance with the schedule. To do so, for example, the power cabinet can direct power from the power module to a dispenser of the chain of dispensers. The power cabinet can also transmit control signals to the dispensers such that only one dispenser can dispense power at a time by controlling the switches in the dispensers that enable power to travel through the dispensers to the vehicles. For example, each instance in which the power cabinet transmits a control signal to cause one dispenser to dispense energy to a vehicle, the power cabinet can transmit a control signal to the dispenser that was dispensing energy (e.g., was in the charging state) to cause the dispenser to stop dispensing energy. The power cabinet can identify the time periods or the rankings from the schedule and transmit control signals to the dispensers according to the time periods or rankings to sequentially enable the dispensers to power vehicles according to the schedule. The power cabinet can cycle between the dispensers to which the power cabinet is distributing energy as the vehicles are fully charged or the time periods identified in the schedule end. In doing so, the power cabinet can distribute power to one dispenser at a time while the other dispensers of the chain remain in the standby or open state.

Figure 5:
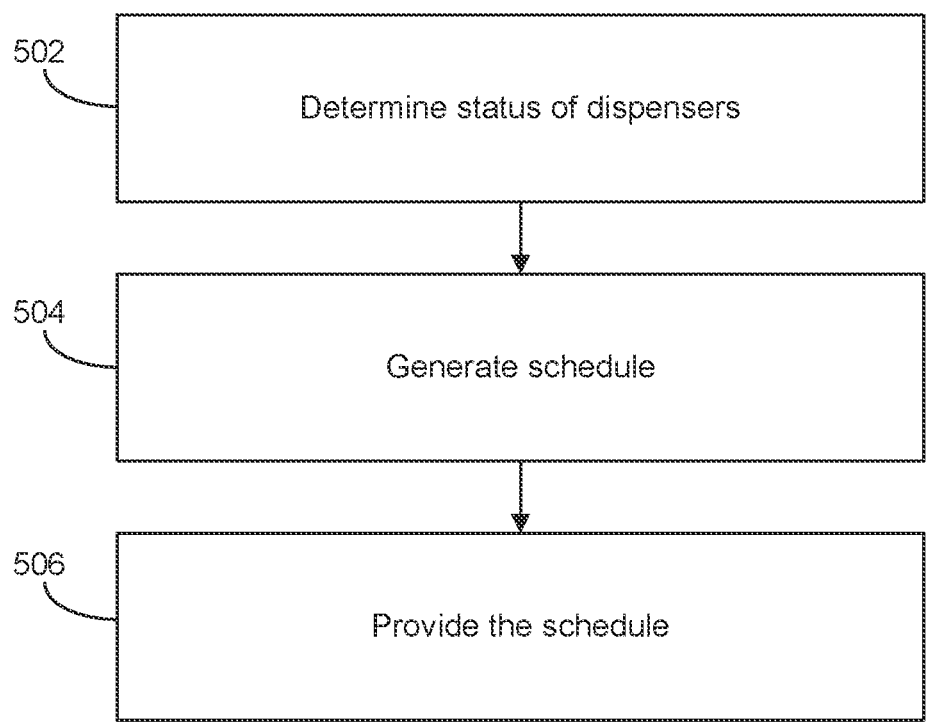
FIG. 5 depicts a method of cloud-based energy management of daisy chain charging, in accordance with present implementations.

FIG. 5 depicts yet another example method 500 of cloud-based energy management of chain charging, in accordance with present implementations. The method 500 can be performed by components depicted in the system 100 of FIG. 1. For example, the method 500 can be performed by a data processing system (e.g., data processing system 102, shown and described with reference to FIG. 1). Performance of method 500 can enable the data processing system to control a chain of dispensers (e.g., electricity dispensers) across a network. At ACT 502, the method 500 can include determining the status of dispensers. The data processing system can determine a status of each of a plurality of dispensers responsive to an arrival of an electric vehicle at a dispenser of the plurality of dispensers coupled with a power module of a power cabinet. At ACT 504, the method 500 can include generating a schedule. The data processing system can generate the schedule to control the plurality of dispensers based at least in part on the status of each of the plurality of dispensers. At ACT 506, the method 500 can include providing the schedule. The data processing system can provide the schedule to the power cabinet to cause the power cabinet to control the power module to deliver power to one of the plurality of dispensers in accordance with the schedule.

Figure 6:
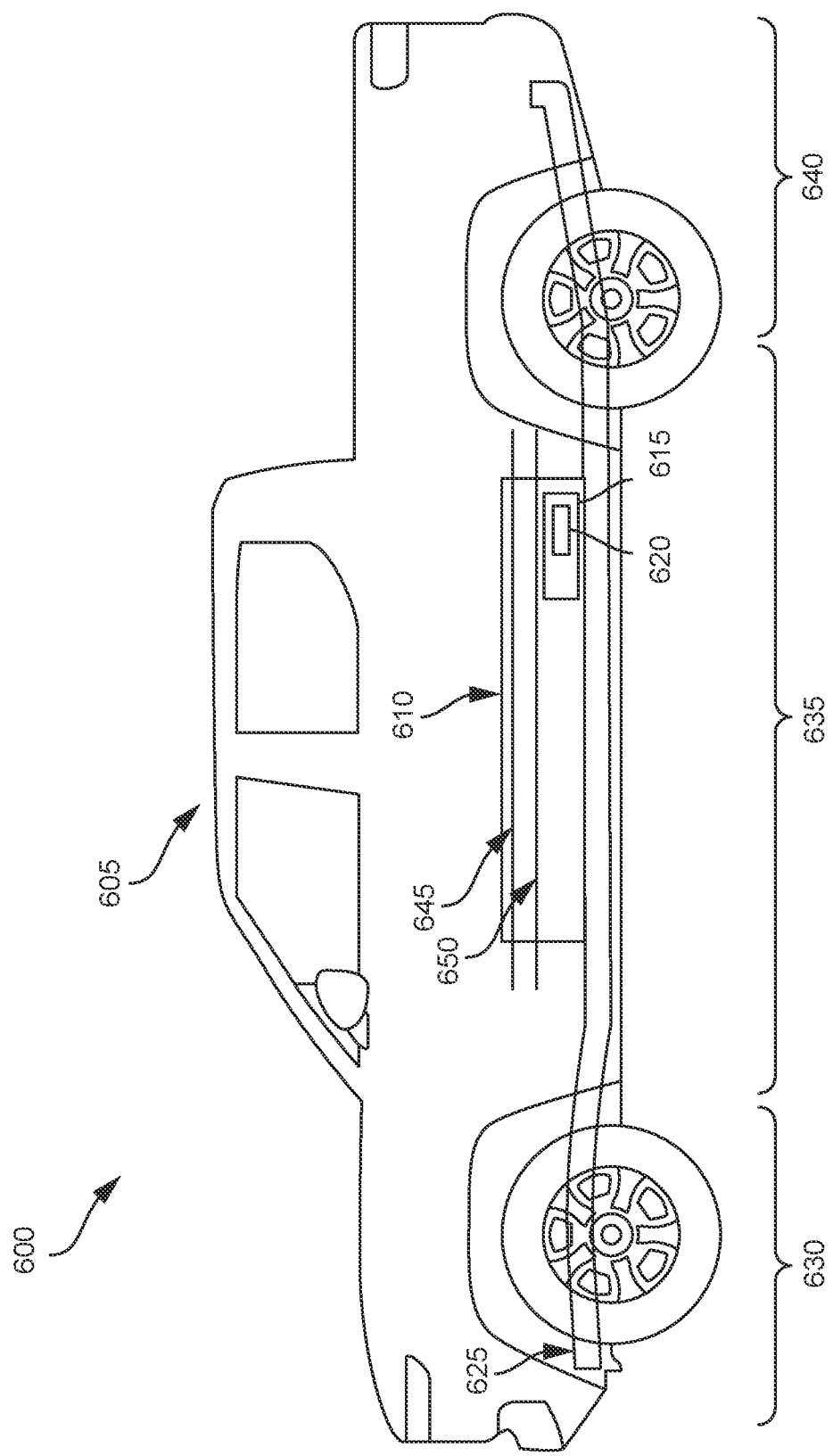
FIG. 6 depicts an electric vehicle, in accordance with the present embodiments.

FIG. 6 depicts an example cross-sectional view 600 of an electric vehicle 605 installed with at least one battery pack 610, in accordance with present implementations. Electric vehicles 605 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 610 can also be used as an energy storage system to power a building, such as a residential home or commercial building. Electric vehicles 605 can be fully electric or partially electric (e.g., plug-in hybrid) and further, electric vehicles 605 can be fully autonomous, partially autonomous, or unmanned. Electric vehicles 605 can also be human operated or non-autonomous. Electric vehicles 605 such as electric trucks or automobiles can include on-board battery packs 610, battery modules 615, or battery cells 620 to power the electric vehicles. The electric vehicle 605 can include a chassis 625 (e.g., a frame, internal frame, or support structure). The chassis 625 can support various components of the electric vehicle 605. The chassis 625 can span a front portion 630 (e.g., a hood or bonnet portion), a body portion 635, and a rear portion 640 (e.g., a trunk, payload, or boot portion) of the electric vehicle 605. The battery pack 610 can be installed or placed within the electric vehicle 605. For example, the battery pack 610 can be installed on the chassis 625 of the electric vehicle 605 within one or more of the front portion 630, the body portion 635, or the rear portion 640. The battery pack 610 can include or connect with at least one busbar, e.g., a current collector element. For example, the first busbar 645 and the second busbar 650 can include electrically conductive material to connect or otherwise electrically couple the battery modules 615 or the battery cells 620 with other electrical components of the electric vehicle 605 to provide electrical power to various systems or components of the electric vehicle 605.

Figure 7:
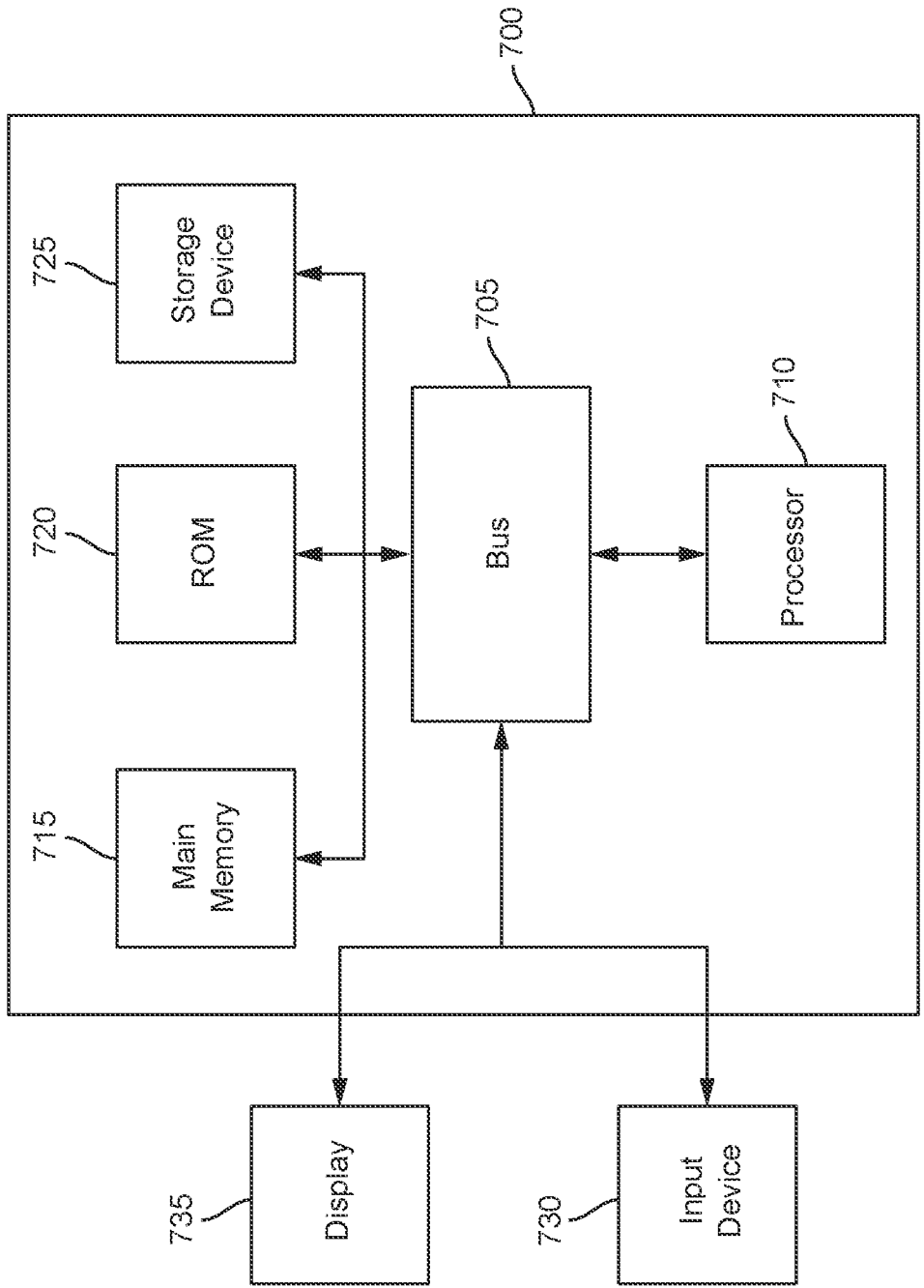
FIG. 7 is a block diagram illustrating an architecture for a computer system that can be employed to implement elements of the systems and methods described and illustrated herein.

FIG. 7 depicts an example block diagram of an example computer system 700, in accordance with some implementations. The computer system or computing device 700 can include or be used to implement a data processing system or its components. The computing system 700 includes at least one bus 705 or other communication component for communicating information and at least one processor 710 or processing circuit coupled to the bus 705 for processing information. The computing system 700 can also include one or more processors 710 or processing circuits coupled to the bus for processing information. The computing system 700 also includes at least one main memory 715, such as a random access memory (RAM) or other dynamic storage device, coupled to the bus 705 for storing information, and instructions to be executed by the processor 710. The main memory 715 can be used for storing information during execution of instructions by the processor 710. The computing system 700 can further include at least one read only memory (ROM) 720 or other static storage device coupled to the bus 705 for storing static information and instructions for the processor 710. A storage device 725, such as a solid state device, magnetic disk or optical disk, can be coupled to the bus 705 to persistently store information and instructions.

The computing system 700 can be coupled via the bus 705 to a display 735, such as a liquid crystal display, or active matrix display, for displaying information to a user such as a driver of the electric vehicle 605 or other end user. An input device 730, such as a keyboard or voice interface can be coupled to the bus 705 for communicating information and commands to the processor 710. The input device 730 can include a touch screen display 735. The input device 730 can also include a cursor control, such as a mouse, a trackball, or cursor direction keys, for communicating direction information and command selections to the processor 710 and for controlling cursor movement on the display 735.

The processes, systems and methods described herein can be implemented by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement can also be employed to execute the instructions contained in main memory 715. Hard-wired circuitry can be used in place of or in combination with software instructions together with the systems and methods described herein. Systems and methods described herein are not limited to any specific combination of hardware circuitry and software.

Although an example computing system has been described in FIG. 7, the subject matter including the operations described in this specification can be implemented in other types of digital electronic circuitry, or in computer software, firmware, or hardware, including the structures disclosed in this specification and their structural equivalents, or in combinations of one or more of them.

Although an example computing system has been described in FIG. 7, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
one or more processors, coupled with memory, to:
    identify, responsive to an arrival of an electric vehicle at a dispenser of a plurality of dispensers coupled with a power module of a power cabinet, a status of each dispenser of the plurality of dispensers, the status comprising a charging state, a standby state, or an open state;
    identify a dispatch schedule for each electric vehicle of a plurality of electric vehicles connected to dispensers of the plurality of dispensers in the charging state or the standby state;
    rank the plurality of electric vehicles based on the dispatch schedule of each electric vehicle of the plurality of electric vehicles;
    generate a schedule to control the plurality of dispensers based on the status of each dispenser of the plurality of dispensers and the rankings of the plurality of electric vehicles; and
    provide the schedule to the power cabinet to cause the power cabinet to control the power module to deliver power to one of the plurality of dispensers in accordance with the schedule.

2. The system of claim 1, comprising the one or more processors to:
receive, via a network and from the plurality of dispensers, the status of each of the plurality of dispensers; and
identify a subset of the plurality of dispensers in the standby state or the charging state;
wherein the one or more processors generate the schedule comprising a time period in which to charge via each dispenser in the subset.

3. The system of claim 2, wherein the status of a second dispenser of the plurality of dispensers comprises the charging state, and comprising the one or more processors to:
generate the schedule based on a determination that the electric vehicle has a higher rank than a second electric vehicle connected to the second dispenser; and
configure, responsive to the determination, the schedule to cause the power cabinet to change the status of the second dispenser from the charging state to the standby state and the status of the dispenser to the charging state.

4. The system of claim 1, comprising:
the one or more processors to provide the schedule to the power cabinet to cause the power cabinet to adjust the status of each of the plurality of dispensers such that only one dispenser is in the charging state at a time.

5. The system of claim 1, comprising the one or more processors to:
identify a state of charge of each electric vehicle of the plurality of electric vehicles connected to the dispensers of the plurality of dispensers in the charging state or the standby state; and rank the plurality of electric vehicles based on the state of charge of each electric vehicle of the plurality of electric vehicles.

6. The system of claim 5, wherein the one or more processors rank the plurality of electric vehicles responsive to the arrival of the electric vehicle at the dispenser.

7. The system of claim 1, comprising the one or more processors to:
identify a state of charge of each electric vehicle of the plurality of electric vehicles connected to the dispensers of the plurality of dispensers in the charging state or the standby state; and
rank the plurality of electric vehicles in ascending or descending order based on the state of charge of each of the plurality of electric vehicles.

8. The system of claim 1, comprising the one or more processors to:
receive, from the plurality of electric vehicles connected to the plurality of dispensers, a state of charge of each electric vehicle of the plurality of electric vehicles connected to the dispensers of the plurality of dispensers in the charging state or the standby state; and
rank the plurality of electric vehicles based on the state of charge of each of the plurality of electric vehicles.

9. The system of claim 1, comprising:
the one or more processors to rank the plurality of electric vehicles in ascending or descending order according to a travel distance of each electric vehicle of the plurality of electric vehicles within a time period.

10. The system of claim 1, comprising the one or more processors to:
render, on a computing device, identifications of a plurality of ranking functions;
receive, from the computing device, an input comprising an identification of a selected ranking function from the plurality of ranking functions; and
generate the schedule based at least in part on the selected ranking function.

11. The system of claim 1, comprising:
the one or more processors to generate a queue indicating an order in which to charge the plurality of electric vehicles connected to the plurality of dispensers.

12. The system of claim 1, wherein the one or more processors generate the schedule to indicate a time period to charge a second electric vehicle of the plurality of electric vehicles connected to the plurality of dispensers.

13. The system of claim 12, comprising the one or more processors to:
identify a destination of the second electric vehicle;
determine a target state of charge for the second electric vehicle based on the destination; and
determine the time period based on the target state of charge for the second electric vehicle.

14. A method, comprising:
identifying, by one or more processors coupled with memory and responsive to an arrival of an electric vehicle at a dispenser of a plurality of dispensers coupled with a power module of a power cabinet, a status of each dispenser of the plurality of dispensers, the status comprising a charging state, a standby state, or an open state;
identifying, by the one or more processors, a dispatch schedule for each electric vehicle of a plurality of electric vehicles connected to dispensers of the plurality of dispensers in the charging state or the standby state;
ranking, by the one or more processors, the plurality of electric vehicles based on the dispatch schedule of each electric vehicle of the plurality of electric vehicles;
generating, by the one or more processors, a schedule to control the plurality of dispensers based on the status of each dispenser of the plurality of dispensers and the rankings of the plurality of electric vehicles; and
providing, by the one or more processors, the schedule to the power cabinet to cause the power module to deliver power to one of the plurality of dispensers in accordance with the schedule.

15. The method of claim 14, further comprising:
identifying, by the one or more processors, a subset of the plurality of dispensers in the standby state or the charging state;
wherein the one or more processors generate the schedule comprising a time period in which to charge via each dispenser in the subset.

16. The method of claim 15, wherein the status of a second dispenser comprises the charging state, and wherein generating the schedule comprises:
determining, by the one or more processors, the electric vehicle has a higher rank than a second electric vehicle connected to the second dispenser; and
configuring, by the one or more processors, the schedule such that the schedule causes the power cabinet to change the status of the second dispenser from the charging state to the standby state and the status of the dispenser to the charging state.

* * * * *